(12) United States Patent
Xiong et al.

(10) Patent No.: US 11,159,254 B2
(45) Date of Patent: Oct. 26, 2021

(54) AUTOMATIC MISMATCH CALIBRATION CIRCUIT AND METHOD, AND RADIO FREQUENCY RECEIVER SYSTEM

(71) Applicants: VeriSilicon Microelectronics (Shanghai) Co., Ltd., Shanghai (CN); VeriSilicon Holdings Co., Ltd., Cayman Islands (GB)

(72) Inventors: Tingwen Xiong, Shanghai (CN); Yi Zeng, Shanghai (CN); Tony Qian, Shanghai (CN)

(73) Assignees: VeriSilicon Microelectronics (Shanghai) Co., Ltd., Shanghai (CN); VeriSilicon Holdings Co., Ltd., Grand Cayman (KY)

( * ) Notice: Subject to any disclaimer, the term of this patent is extended or adjusted under 35 U.S.C. 154(b) by 0 days.

(21) Appl. No.: 17/037,697

(22) Filed: Sep. 30, 2020

(65) Prior Publication Data

US 2021/0143920 A1 May 13, 2021

(30) Foreign Application Priority Data

Nov. 8, 2019 (CN) .......................... 2019110853056

(51) Int. Cl.
*H04B 17/00* (2015.01)
*H04B 17/21* (2015.01)
*H04B 17/336* (2015.01)
*G16Y 10/75* (2020.01)

(52) U.S. Cl.
CPC ........... *H04B 17/21* (2015.01); *H04B 17/336* (2015.01); *G16Y 10/75* (2020.01)

(58) Field of Classification Search
CPC ........ H04B 17/21; H04B 17/336; H04B 1/06; H04B 17/318; H04B 10/613; H04B 1/38; H04B 1/40; H04B 1/405; H04B 1/0475; H04B 1/48; G16Y 10/75
See application file for complete search history.

(56) References Cited

U.S. PATENT DOCUMENTS

2016/0269208 A1* 9/2016 Smail .................. H04L 27/3863

\* cited by examiner

*Primary Examiner* — Nhan T Le

(57) ABSTRACT

The present disclosure provides an automatic mismatch calibration circuit and method, and a radio frequency receiver system. The automatic mismatch calibration circuit includes: at least one direct current (DC) offset estimation and calibration module coupled to a rear end of a radio frequency (RF) receiver to estimate a DC offset of received signals transmitted in an I channel and a Q channel to obtain an I-channel-DC-component and a Q-channel-DC-component, and compensate the I-channel-DC-component and the Q-channel-DC-component to the received signals corresponding to the I channel and the Q channel to achieve DC offset calibration. The present disclosure solves the problem that the existing mismatch calibration circuit cannot meet the low power consumption requirements of the system.

24 Claims, 5 Drawing Sheets

AUTOMATIC MISMATCH CALIBRATION CIRCUIT AND METHOD, AND RADIO FREQUENCY RECEIVER SYSTEM

CROSS REFERENCE TO RELATED APPLICATION

The present application is related to and claims the benefit of priority to Chinese Patent Application No. 2019110853056 filed on Nov. 8, 2019, the contents of which are incorporated herein by reference in its entirety.

BACKGROUND

Field of Disclosure

The present disclosure relates to the technical field of wireless communication, in particular to an automatic mismatch calibration circuit and method, and a radio frequency receiver system.

Description of Related Arts

In receivers of Internet of Things (IoT), there are usually various circuit mismatches, including DC offset and IQ mismatch of the In-phase channel and Quadrature channel, etc. These mismatches will affect the received signal-to-noise ratio of the receiver, thereby affecting the demodulation performance of the receiver.

The current mainstream receiver systems will calibrate the mismatches of these radio frequency (RF) circuits to improve the demodulation performance of the receiver. However, different calibration methods achieve different calibration effects, and power consumptions are also quite different. And because most of the receiver systems of IoT are powered by batteries, higher requirements are put forward for the calibration power consumption of the receiver systems of IoT.

SUMMARY OF THE PRESENT DISCLOSURE

The present disclosure provides an automatic mismatch calibration circuit and method, and a radio frequency receiver system, to solve the problem that the existing mismatch calibration circuit cannot meet the low power consumption requirements of the system.

The present disclosure provides an automatic mismatch calibration circuit, which includes: at least one direct current (DC) offset estimation and calibration module coupled to a rear end of a radio frequency (RF) receiver to estimate a DC offset of received signals transmitted in an I channel and a Q channel to obtain an I-channel-DC-component and a Q-channel-DC-component, and compensate the I-channel-DC-component and the Q-channel-DC-component to the received signals corresponding to the I channel and the Q channel to achieve DC offset calibration.

Optionally, the DC offset estimation and calibration module includes an I channel DC offset estimation and calibration part and a Q channel DC offset estimation and calibration part.

The I channel DC offset estimation and calibration part includes: an I channel input buffer unit coupled to the I channel at the rear end of the RF receiver to buffer the received signal transmitted in the I channel, an I channel averaging unit coupled to the I channel input buffer unit to perform time-domain averaging on the received signal stored in the I channel input buffer unit in a first preset time period to obtain the I-channel-DC-component, and an I channel adder unit, a first input end of the I channel adder unit is coupled to the I channel at the rear end of the RF receiver, and a second input end of the I channel adder unit is coupled to the I channel averaging unit, to perform a subtraction operation on the received signal transmitted in the I channel and the I-channel-DC-component to achieve the DC offset calibration of the received signal transmitted in the I channel.

The Q channel DC offset estimation and calibration part includes: a Q channel input buffer unit coupled to the Q channel at the rear end of the RF receiver to buffer the received signal transmitted in the Q channel, a Q channel averaging unit coupled to the Q channel input buffer unit to perform time-domain averaging on the received signal stored in the Q channel input buffer unit in a first preset time period to obtain the Q-channel-DC-component, and a Q channel adder unit, a first input end of the Q channel adder unit is coupled to the Q channel at the rear end of the RF receiver, and a second input end of the Q channel adder unit is coupled to the Q channel averaging unit, to perform a subtraction operation on the received signal transmitted in the Q channel and the Q-channel-DC-component to achieve the DC offset calibration of the received signal transmitted in the Q channel.

Optionally, the automatic mismatch calibration circuit further includes: at least one amplitude mismatch estimation and calibration module coupled between the RF receiver and the DC offset estimation and calibration module or at the rear end of the DC offset estimation and calibration module, to estimate an amplitude mismatch of the received signals transmitted in the I channel and the Q channel to obtain an amplitude compensation value, and then compensate the amplitude compensation value to the received signal in the I channel or the Q channel to achieve amplitude mismatch calibration.

Optionally, the amplitude mismatch estimation and calibration module includes: an I channel buffer unit coupled to the I channel at a front end of the DC offset estimation and calibration module or an I channel output end of the DC offset estimation and calibration module to buffer the received signal transmitted in the I channel; an I channel peak averaging unit coupled to the I channel buffer unit to perform peak averaging on the received signal stored in the I channel buffer unit in a second preset time period to obtain an I channel amplitude value; a Q channel buffer unit coupled to the Q channel at the front end of the DC offset estimation and calibration module or a Q channel output end of the DC offset estimation and calibration module to buffer the received signal transmitted in the Q channel; a Q channel peak averaging unit coupled to the Q channel buffer unit to perform peak averaging on the received signal stored in the Q channel buffer unit in a second preset time period to obtain a Q channel amplitude value; a divider unit, a first input end of the divider unit is coupled to the I channel peak averaging unit, and a second input end of the divider unit is coupled to the Q channel peak averaging unit, to divide the Q channel amplitude value by the I channel amplitude value to obtain an amplitude compensation value; and an amplitude compensation unit, a first input end of the amplitude compensation unit is coupled to the I channel at the front end of the DC offset estimation and calibration module or the I channel output end of the DC offset estimation and calibration module, or the first input end of the amplitude compensation unit is coupled to the Q channel at the front end of the DC offset estimation and calibration module or the Q channel output end of the DC offset estimation and calibration module, a second input end of the amplitude compensation unit is coupled to the divider unit to compensate the amplitude compensation value to the received signal in the I channel or the received signal in the Q channel, to achieve the amplitude mismatch calibration.

Optionally, the amplitude mismatch estimation and calibration module further includes: an averaging unit coupled between the divider unit and the amplitude compensation unit to average a plurality of amplitude compensation values to obtain a final amplitude compensation value.

Optionally, when a number of the DC offset estimation and calibration module and the amplitude mismatch estimation and calibration module is multiple, the DC offset estimation and calibration modules and the amplitude mismatch estimation and calibration modules are arranged alternately at intervals.

Optionally, the automatic mismatch calibration circuit further includes: at least one phase mismatch estimation and calibration module coupled between the RF receiver and the DC offset estimation and calibration module or at the rear end of the DC offset estimation and calibration module to adjust an initial phase compensation value based on a preset step within a preset sliding window to obtain phase compensation adjustment values and signal-to-noise ratios corresponding to the phase compensation adjustment values, and use a phase compensation adjustment value corresponding to an optimal signal-to-noise ratio as a phase compensation value to compensate to the received signals of the I channel and the Q channel to achieve phase mismatch calibration.

Optionally, the phase mismatch estimation and calibration module includes: a sliding phase pre-compensation unit to provide the initial phase compensation value, adjust the initial phase compensation value based on the preset step within the preset sliding window to obtain the phase compensation adjustment values, select the optimal signal-to-noise ratio from the signal-to-noise ratios, and use the phase compensation adjustment value corresponding to the optimal signal-to-noise ratio as the phase compensation value; a phase compensation unit, a first input end of the phase compensation unit is coupled to the I channel at the front end of the DC offset estimation and calibration module or the I channel output end of the DC offset estimation and calibration module, a second input end of the phase compensation unit is coupled to the Q channel at the front end of the DC offset estimation and calibration module or the Q channel output end of the DC offset estimation and calibration module, and a third input end of the phase compensation unit is coupled to the sliding phase pre-compensation unit to sequentially compensate the initial phase compensation value and the phase compensation adjustment values to the received signals in the I channel and the Q channel, and compensate the phase compensation value to the received signals in the I channel and the Q channel to achieve the phase mismatch calibration; and a demodulation and signal-to-noise ratio estimation unit coupled between the phase compensation unit and the sliding phase pre-compensation unit to demodulate and estimate a signal-to-noise ratio of an output of the phase compensation unit to obtain the signal-to-noise ratio corresponding to a current phase.

Optionally, when a number of the DC offset estimation and calibration module and the phase mismatch estimation and calibration module is multiple, the DC offset estimation and calibration modules and the phase mismatch estimation and calibration modules are arranged alternately at intervals.

Optionally, the automatic mismatch calibration circuit further includes: at least one quadrature mismatch estimation and calibration module coupled between the RF receiver and the DC offset estimation and calibration module or at the rear end of the DC offset estimation and calibration module to estimate an amplitude mismatch of the received signals transmitted in the I channel and the Q channel to obtain an amplitude compensation value, compensate the amplitude compensation value to the received signal in the I channel or the Q channel, adjust an initial phase compensation value based on a preset step within a preset sliding window to obtain phase compensation adjustment values, sequentially compensate the initial phase compensation value and the phase compensation adjustment values to the received signals in the I channel and the Q channel, estimate a signal-to-noise ratio of the compensated received signals to obtain signal-to-noise ratios corresponding to phases, and use the phase compensation adjustment value corresponding to an optimal signal-to-noise ratio as a phase compensation value to compensate to the received signals of the I channel and the Q channel to achieve amplitude and phase mismatch calibration.

Optionally, the quadrature mismatch estimation and calibration module includes: an I channel buffer unit coupled to the I channel at a front end of the DC offset estimation and calibration module or an I channel output end of the DC offset estimation and calibration module to buffer the received signal transmitted in the I channel; an I channel peak averaging unit coupled to the I channel buffer unit to perform peak averaging on the received signal stored in the I channel buffer unit in a second preset time period to obtain an I channel amplitude value; a Q channel buffer unit coupled to the Q channel at the front end of the DC offset estimation and calibration module or a Q channel output end of the DC offset estimation and calibration module to buffer the received signal transmitted in the Q channel; a Q channel peak averaging unit coupled to the Q channel buffer unit to perform peak averaging on the received signal stored in the Q channel buffer unit in a second preset time period to obtain a Q channel amplitude value; a divider unit, a first input end of the divider unit is coupled to the I channel peak averaging unit, and a second input end of the divider unit is coupled to the Q channel peak averaging unit, to divide the Q channel amplitude value by the I channel amplitude value to obtain an amplitude compensation value; and a sliding phase pre-compensation unit to provide the initial phase compensation value, adjust the initial phase compensation value based on the preset step within the preset sliding window to obtain the phase compensation adjustment values, select the optimal signal-to-noise ratio from the signal-to-noise ratios, and use the phase compensation adjustment value corresponding to the optimal signal-to-noise ratio as the phase compensation value; a compensation unit, a first input end of the compensation unit is coupled to the I channel at the front end of the DC offset estimation and calibration module or the I channel output end of the DC offset estimation and calibration module, a second input end of the compensation unit is coupled to the Q channel at the front end of the DC offset estimation and calibration module or the Q channel output end of the DC offset estimation and calibration module, a third input end of the compensation unit is coupled to the divider unit, and a fourth input end of the compensation unit is coupled to the sliding phase pre-compensation unit to compensate the amplitude compensation value to the received signal in the I channel or the received signal in the Q channel, sequentially compensate the initial phase compensation value and the phase compensation adjustment values to the received signals in the I channel and the Q channel, and compensate the phase compensation value to the received signals in the I channel and the Q channel to achieve amplitude and phase mismatch calibration; and a demodulation and signal-to-noise ratio estimation unit coupled between the compensation unit and the sliding phase pre-compensation unit to demodulate and estimate a signal-to-noise ratio of an output of the compensation unit to obtain the signal-to-noise ratio corresponding to a current phase.

Optionally, the quadrature mismatch estimation and calibration module further comprises: an averaging unit coupled between the divider unit and the compensation unit to average a plurality of amplitude compensation values to obtain a final amplitude compensation value.

Optionally, when a number of the DC offset estimation and calibration module and the quadrature mismatch estimation and calibration module is multiple, the DC offset estimation and calibration modules and the quadrature mismatch estimation and calibration modules are arranged alternately at intervals.

The present disclosure further provides an automatic mismatch calibration method. The method includes performing DC offset estimation and calibration operation at least once, the DC offset estimation and calibration operation includes: obtaining an I-channel-DC-component and a Q-channel-DC-component by estimating a DC offset of received signals transmitted in an I channel and a Q channel; compensating the I-channel-DC-component and the Q-channel-DC-component to the received signals corresponding to the I channel and the Q channel to achieve DC offset calibration.

Optionally, the DC offset estimation and calibration operation includes: in a first preset time period, performing time-domain averaging on the received signal transmitted in the I channel to obtain the I-channel-DC-component, and finishing the DC offset estimation of the received signal transmitted in the I channel; performing a subtraction operation on the received signal transmitted in the I channel and the I-channel-DC-component to remove the DC offset, and realizing the DC offset calibration of the received signal transmitted in the I channel; in the first preset time period, performing time-domain averaging on the received signal transmitted in the Q channel to obtain the Q-channel-DC-component, and finishing the DC offset estimation of the received signal transmitted in the Q channel; and performing a subtraction operation on the received signal transmitted in the Q channel and the Q-channel-DC-component to remove the DC offset, and realizing the DC offset calibration of the received signal transmitted in the Q channel.

Optionally, the automatic mismatch calibration method further includes: performing an amplitude mismatch estimation and calibration operation at least once before or after the DC offset estimation and calibration operation. The amplitude mismatch estimation and calibration operation includes: estimating an amplitude mismatch of the received signals transmitted in the I channel and the Q channel to obtain an amplitude compensation value; and compensating the amplitude compensation value to the received signal in the I channel or the Q channel to achieve amplitude mismatch calibration.

Optionally, the amplitude mismatch estimation and calibration operation includes: in a second preset time period, performing peak averaging on the received signals transmitted in the I channel and the Q channel respectively to obtain an I channel amplitude value and a Q channel amplitude value; dividing the Q channel amplitude value by the I channel amplitude value to obtain an amplitude compensation value, and finishing the amplitude mismatch estimation; and compensating the amplitude compensation value to the received signal in the I channel or the received signal in the Q channel to achieve the amplitude mismatch calibration.

Optionally, the amplitude mismatch estimation and calibration operation further includes: repeating the method for obtaining the amplitude compensation value at least once, and averaging a plurality of amplitude compensation values to obtain a final amplitude compensation value.

Optionally, when the DC offset estimation and calibration operation and the amplitude mismatch estimation and calibration operation are both performed multiple times, the DC offset estimation and calibration operation and the amplitude mismatch estimation and calibration operation are performed alternately.

Optionally, the automatic mismatch calibration method further includes performing a phase mismatch estimation and calibration operation at least once before or after the DC offset estimation and calibration operation. The phase mismatch estimation and calibration operation includes: adjusting an initial phase compensation value based on a preset step within a preset sliding window to obtain phase compensation adjustment values and signal-to-noise ratios corresponding to the phase compensation adjustment values, and using a phase compensation adjustment value corresponding to an optimal signal-to-noise ratio as a phase compensation value to compensate to the received signals of the I channel and the Q channel to achieve phase mismatch calibration.

Optionally, the phase mismatch estimation and calibration operation includes: providing an initial phase compensation value, compensating the initial phase compensation value to the received signals transmitted in the I channel and the Q channel, and demodulating and estimating the signal-to-noise ratios of the received signals transmitted in the I channel and the Q channel after compensation; adjusting an initial phase compensation value based on a preset step within a preset sliding window to obtain phase compensation adjustment values, sequentially compensating the phase compensation adjustment values to the received signals in the I channel and the Q channel, and sequentially demodulating and estimating the signal-to-noise ratios of the received signals transmitted in the I channel and the Q channel after compensation; and selecting the optimal signal-to-noise ratio from the signal-to-noise ratios, and using a phase compensation adjustment value corresponding to the optimal signal-to-noise ratio as a phase compensation value to compensate to the received signals transmitted in the I channel and the Q channel to achieve phase mismatch calibration.

Optionally, when the DC offset estimation and calibration operation and the phase mismatch estimation and calibration operation are both performed multiple times, the DC offset estimation and calibration operation and the phase mismatch estimation and calibration operation are performed alternately.

Optionally, the automatic mismatch calibration method further includes performing a quadrature mismatch estimation and calibration operation at least once before or after the DC offset estimation and calibration operation. The quadrature mismatch estimation and calibration operation includes: estimating an amplitude mismatch of the received signals transmitted in the I channel and the Q channel to obtain an amplitude compensation value, and adjusting an initial phase compensation value based on a preset step within a preset sliding window to obtain phase compensation adjustment values; compensating the amplitude compensation value to the received signal in the I channel or the Q channel, and sequentially compensating the initial phase compensation value and the phase compensation adjustment values to the received signals in the I channel and the Q channel; and demodulating and estimating the signal-to-noise ratios of the received signals transmitted in the I channel and the Q channel after compensation, and using a phase compensation adjustment value corresponding to the optimal signal-to-noise ratio as a phase compensation value to compensate to the received signals in the I channel and the Q channel to achieve amplitude and phase mismatch calibration.

Optionally, the quadrature mismatch estimation and calibration operation includes: in a second preset time period, performing peak averaging on the received signals transmitted in the I channel and the Q channel respectively to obtain an I channel amplitude value and a Q channel amplitude value; dividing the Q channel amplitude value by the I channel amplitude value to obtain an amplitude compensation value, and finishing the amplitude mismatch estimation; and compensating the amplitude compensation value to the received signal in the I channel or the received signal in the Q channel, compensating the initial phase compensation value to the received signals in the I channel and the Q channel, and demodulating and estimating the signal-to-noise ratios of the received signals transmitted in the I channel and the Q channel after compensation; adjusting the initial phase compensation value based on the preset step within the preset sliding window to obtain the phase compensation adjustment values; compensating the amplitude compensation value to the received signal in the I channel or the received signal in the Q channel, sequentially compensating the phase compensation adjustment values to the received signals in the I channel and the Q channel, and sequentially demodulating and estimating the signal-to-noise ratios of the received signals in the I channel and the Q channel after compensation; and selecting the optimal signal-to-noise ratio from the signal-to-noise ratios, and using a phase compensation adjustment value corresponding to the optimal signal-to-noise ratio as a phase compensation value, compensating the amplitude compensation value to the received signal in the I channel or the received signal in the Q channel, and compensating the phase compensation value to the received signals in the I channel and the Q channel to achieve amplitude and phase mismatch calibration.

Optionally, the quadrature mismatch estimation and calibration operation further includes: repeating the method for obtaining the amplitude compensation value at least once, and averaging a plurality of amplitude compensation values to obtain a final amplitude compensation value.

Optionally, when the DC offset estimation and calibration operation and the quadrature mismatch estimation and calibration operation are both performed multiple times, the DC offset estimation and calibration operation and the quadrature mismatch estimation and calibration operation are performed alternately.

The present disclosure further provides a radio frequency receiver system, including: an RF transmitter, an RF receiver, and the above automatic mismatch calibration circuit coupled to the rear end of the RF receiver.

As mentioned above, the automatic mismatch calibration circuit and method, and the radio frequency receiver system of the present disclosure improves the received signal-to-noise ratio and demodulation performance of the system by performing DC offset estimation and calibration, DC offset estimation and calibration and amplitude mismatch estimation and calibration, DC offset estimation and calibration and phase mismatch estimation and calibration, or DC offset estimation and calibration and quadrature mismatch estimation and calibration. The calibration process of the present disclosure may be performed before or after the communication, interrupt the communication, or may be performed during the communication. When the DC offset calibration is performed during the communication process, there is no need to take up time other than the communication, which not only reduces the effective working time of the system, but also reduces the average power consumption of the system, thereby meeting the needs of low-power consumption.

DESCRIPTION OF COMPONENT MARK NUMBERS

Figure 1:
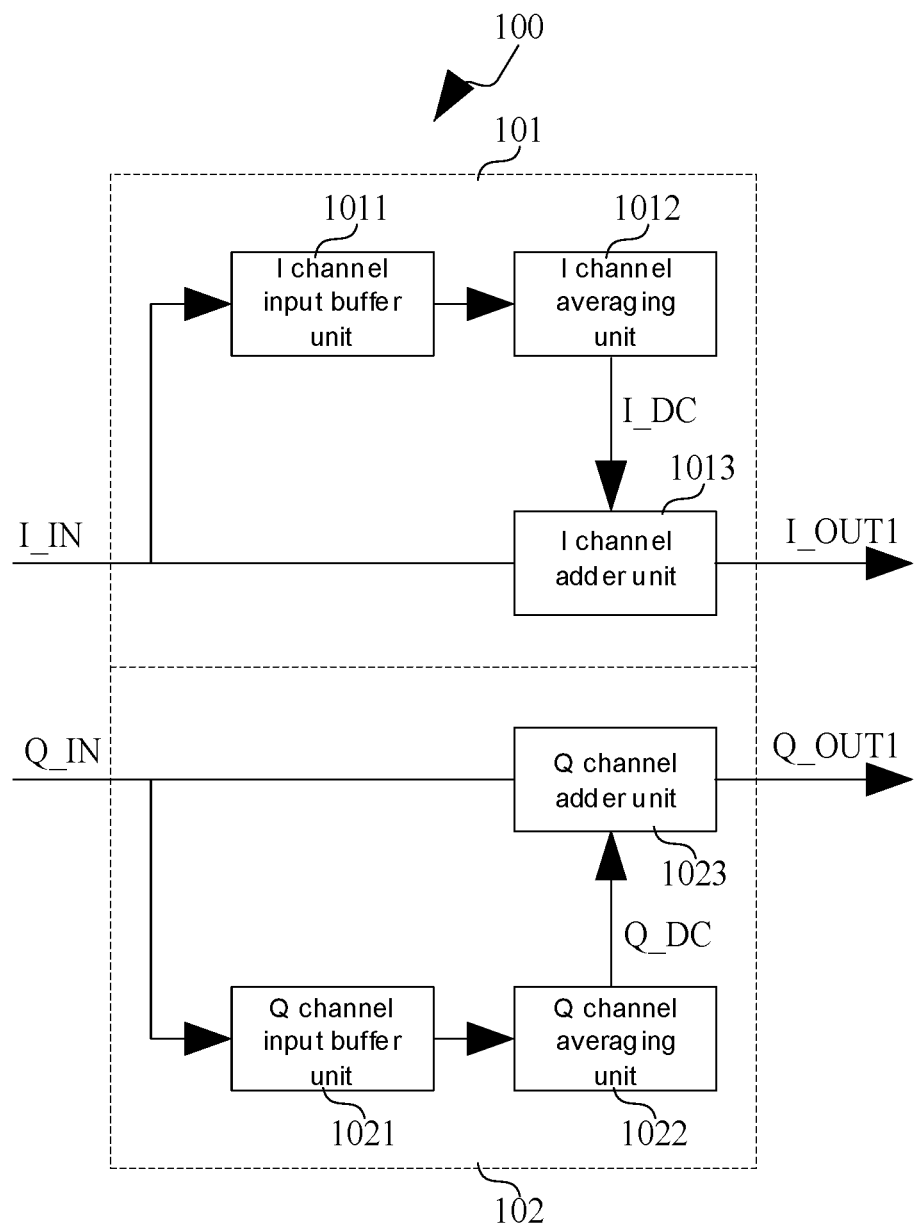
FIG. 1 shows a schematic diagram of an automatic mismatch calibration circuit according to Embodiment 1 of the present disclosure.

10 Automatic mismatch calibration circuit
100 DC offset estimation and calibration module
101 I channel DC offset estimation and calibration part
1011 I channel input buffer unit
1012 I channel averaging unit
1013 I channel adder unit
102 Q channel DC offset estimation and calibration part
1021 Q channel input buffer unit
1022 Q channel averaging unit
1023 Q channel adder unit
200 Amplitude mismatch estimation and calibration module
201 I channel buffer unit
202 I channel peak averaging unit
203 Q channel buffer unit
204 Q channel peak averaging unit
205 Divider unit
206 Amplitude compensation unit
300 Phase mismatch estimation and calibration module
301 Sliding phase pre-compensation unit
302 Phase compensation unit
303 Demodulation and signal-to-noise estimation unit
400 Quadrature mismatch estimation and calibration module
401 I channel buffer unit
402 I channel peak averaging unit
403 Q channel buffer unit
404 Q channel peak averaging unit
405 Divider unit
406 Sliding phase pre-compensation unit
407 Compensation unit 408 Demodulation and signal-to-noise estimation unit
RF transmitter
RF receiver

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure.

Referring to FIGS. 1 to 6. It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complex.

Embodiment 1

As shown in FIG. 1, the present embodiment provides an automatic mismatch calibration circuit. The automatic mismatch calibration circuit 10 includes: at least one DC offset estimation and calibration module 100 coupled to a rear end of an RF receiver to estimate a DC offset of received signals transmitted in an I channel and a Q channel to obtain an I-channel-DC-component and a Q-channel-DC-component, and compensate the I-channel-DC-component and the Q-channel-DC-component to the received signals corresponding to the I channel and the Q channel to achieve DC offset calibration.

In this example, when the number of the DC offset estimation and calibration modules 100 is multiple (i.e. greater than or equal to 2), each of the DC offset estimation and calibration modules 100 is coupled to a rear end of the RF receiver, to perform multiple DC offset calibrations on the received signals transmitted in the I channel and the Q channel successively, thereby improving the calibration accuracy.

As an example, as shown in FIG. 1, the DC offset estimation and calibration module 100 includes: an I channel DC offset estimation and calibration part 101 and a Q channel DC offset estimation and calibration part 102. The I channel DC offset estimation and calibration part 101 includes: an I channel input buffer unit 1011 coupled to the I channel at the rear end of the RF receiver to buffer the received signal I_IN transmitted in the I channel; an I channel averaging unit 1012 coupled to the I channel input buffer unit 1011 to perform time-domain averaging on the received signal stored in the I channel input buffer unit 1011 in a first preset time period to obtain the I-channel-DC-component I_DC; and an I channel adder unit 1013, a first input end of the I channel adder unit 1013 is coupled to the I channel at the rear end of the RF receiver, and a second input end of the I channel adder unit 1013 is coupled to the I channel averaging unit 1012, to perform a subtraction operation on the received signal transmitted in the I channel and the I-channel-DC-component I_DC to achieve the DC offset calibration of the received signal transmitted in the I channel.

The Q channel DC offset estimation and calibration part 102 includes: a Q channel input buffer unit 1021 coupled to the Q channel at the rear end of the RF receiver to buffer the received signal Q_IN transmitted in the Q channel; a Q channel averaging unit 1022 coupled to the Q channel input buffer unit 1021 to perform time-domain averaging on the received signal stored in the Q channel input buffer unit 1021 in a first preset time period to obtain the Q-channel-DC-component Q_DC; and a Q channel adder unit 1023, a first input end of the Q channel adder unit 1023 is coupled to the Q channel at the rear end of the RF receiver, and a second input end of the Q channel adder unit 1023 is coupled to the Q channel averaging unit 1022, to perform a subtraction operation on the received signal transmitted in the Q channel and the Q-channel-DC-component to achieve the DC offset calibration of the received signal transmitted in the Q channel.

In this example, when the storage lengths of the I channel input buffer unit 1011 and the Q channel input buffer unit 1021 are sufficient, the calibration accuracy of the DC offset can be improved by extending the length of the first preset time period. When the storage lengths of the I channel input buffer unit 1011 and the Q channel input buffer unit 1021 are insufficient to meet the extended storage, the calibration accuracy of the DC offset can be improved by increasing the storage lengths of the I channel input buffer unit 1011 and the Q channel input buffer unit 1021 and extending the length of the first preset time period. However, it should be noted that the longer the first preset time period, the higher the calibration accuracy and the worse the timeliness of the calibration. Therefore, in practical applications, calibration accuracy and calibration timeliness need to be comprehensively considered. The actual communication protocol type needs to be considered to reasonably set the length of the first preset time period according to the actual bandwidth and data rate.

Accordingly, the present embodiment further provides an automatic mismatch calibration method. The method includes: performing a DC offset estimation and calibration operation at least once. The DC offset estimation and calibration operation includes: obtaining an I-channel-DC-component and a Q-channel-DC-component by estimating a DC offset of received signals transmitted in an I channel and a Q channel; and compensating the I-channel-DC-component and the Q-channel-DC-component to the received signals corresponding to the I channel and the Q channel to achieve DC offset calibration.

In this example, in order to improve the calibration accuracy, the DC offset estimation and calibration operations may be repeated multiple times (that is, more than or equal to 2 times) to perform multiple DC offset calibrations on the received signals transmitted in the I channel and the Q channel.

As an example, the DC offset estimation and calibration operation includes: in a first preset time period, performing time-domain averaging on the received signal I_IN transmitted in the I channel to obtain the I-channel-DC-component I_DC, and finishing the DC offset estimation of the received signal transmitted in the I channel; performing a subtraction operation on the received signal transmitted in the I channel and the I-channel-DC-component I_DC to remove the DC offset, and realizing the DC offset calibration of the received signal transmitted in the I channel; in the first preset time period, performing time-domain averaging on the received signal Q_IN transmitted in the Q channel to obtain the Q-channel-DC-component Q_DC, and finishing the DC offset estimation of the received signal transmitted in the Q channel; and performing a subtraction operation on the received signal transmitted in the Q channel and the Q-channel-DC-component Q_DC to remove the DC offset, and realizing the DC offset calibration of the received signal transmitted in the Q channel.

In this embodiment, the DC offset calibration accuracy can be improved by extending the length of the first preset time period, that is, the longer the first preset time period, the higher the calibration accuracy, but at the same time the worse the timeliness of the calibration. Therefore, in practical applications, calibration accuracy and calibration timeliness need to be comprehensively considered. The actual communication protocol type needs to be considered to reasonably set the length of the first preset time period according to the actual bandwidth and data rate.

Embodiment 2

Figure 2:
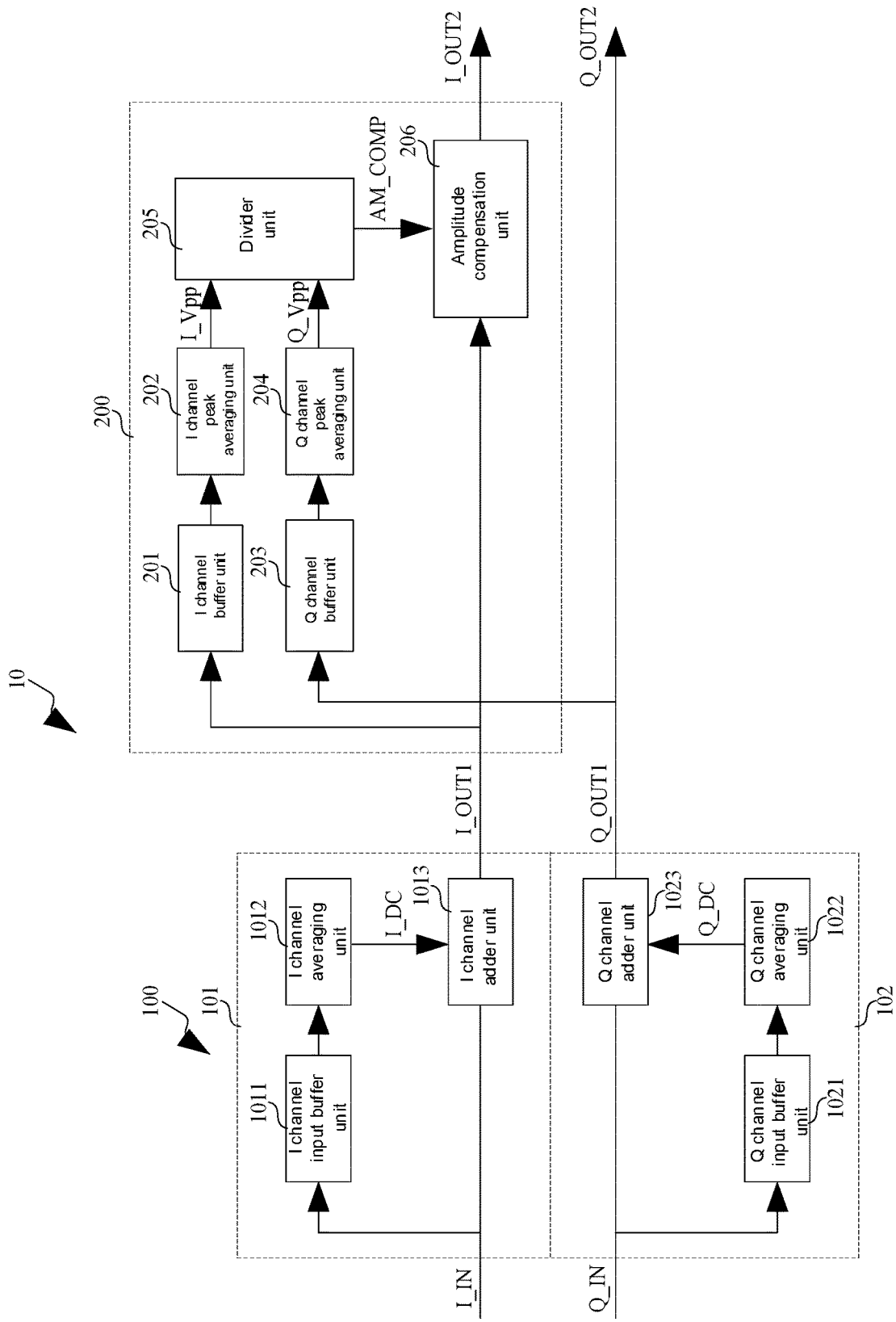
FIG. 2 shows a schematic diagram of an automatic mismatch calibration circuit according to Embodiment 2 of the present disclosure.

As shown in FIG. 2, this embodiment provides an automatic mismatch calibration circuit. Compared with Embodiment 1, the automatic mismatch calibration circuit 10 of this embodiment further includes: at least one amplitude mismatch estimation and calibration module 200 coupled between the RF receiver and the DC offset estimation and calibration module 100 or at the rear end of the DC offset estimation and calibration module 100, to estimate an amplitude mismatch of the received signals transmitted in the I channel and the Q channel to obtain an amplitude compensation value, and then compensate the amplitude compensation value to the received signal in the I channel or the Q channel to achieve amplitude mismatch calibration.

In this example, the number of the DC offset estimation and calibration module 100 and the amplitude mismatch estimation and calibration module 200 may be the same or different.

If the number of the DC offset estimation and calibration module 100 and the amplitude mismatch estimation and calibration module are both one, the DC offset estimation and calibration module 100 is coupled to the rear end of the RF receiver, and the amplitude mismatch estimation and calibration module 200 is coupled between the RF receiver and the DC offset estimation and calibration module 100 or coupled to the rear end of the DC offset estimation and calibration module 100. If the number of the DC offset estimation and calibration module 100 is one, and the number of the amplitude mismatch estimation and calibration module 200 is multiple (that is, greater than or equal to two), the DC offset estimation and calibration module 100 is coupled to the rear end of the RF receiver, a plurality of the amplitude mismatch estimation and calibration modules 200 are all coupled between the RF receiver and the DC offset estimation and calibration module 100, or are all coupled to the rear end of the DC offset estimation and calibration module 100, or are partly coupled between the RF receiver and the DC offset estimation and calibration module 100 and partly coupled to the rear end of the DC offset estimation and calibration module 100. If the number of the DC offset estimation and calibration module 100 is multiple (i.e. greater than or equal to 2), and the number of the amplitude mismatch estimation and calibration module 200 is one, the multiple DC offset estimation and calibration modules 100 are all coupled to the rear end of the RF receiver, the amplitude mismatch estimation and calibration module 200 is coupled to the front end of the first one of the DC offset estimation and calibration modules 100, or coupled to the rear end of the last one of the DC offset estimation and calibration modules 100, or coupled between any two of the DC offset estimation and calibration modules 100.

If the number of the DC offset estimation and calibration module 100 and the number of the amplitude mismatch estimation and calibration module 200 are both multiple (i.e. greater than or equal to 2), the multiple DC offset estimation and calibration modules 100 are all coupled to the rear end of the RF receiver, and the multiple amplitude mismatch estimation and calibration modules are all coupled to the front end of any one of the DC offset estimation and calibration modules 100, or all are coupled to the rear end of any one of the DC offset estimation and calibration modules 100, or are arbitrarily interspersed between the DC offset estimation and calibration modules 100. Preferably, when the number of the DC offset estimation and calibration module 100 and the amplitude mismatch estimation and calibration module 200 are both multiple (i.e. greater than or equal to 2), the DC offset estimation and calibration modules 100 and the amplitude mismatch estimation and calibration modules 200 are alternately arranged at intervals to perform multiple DC offset calibrations and amplitude mismatch calibrations on the received signals transmitted in the I channel and the Q channel, thereby improving the calibration accuracy. It should be noted that when the amplitude mismatch estimation and calibration module 200 is coupled between the RF receiver and the DC offset estimation and calibration module 100, the received signal involved in the amplitude mismatch estimation and calibration module 200 is the received signal transmitted in the I channel and Q channel of the RF receiver. When the amplitude mismatch estimation and calibration module 200 is coupled to the rear end of the DC offset estimation and calibration module 100, the received signal involved in the amplitude mismatch estimation and calibration module 200 is the received signal output from an I channel output end and a Q channel output end of the DC offset estimation and calibration module 100.

As an example, as shown in FIG. 2, the amplitude mismatch estimation and calibration module 200 includes: an I channel buffer unit 201 coupled to the I channel at a front end of the DC offset estimation and calibration module 100 or an I channel output end of the DC offset estimation and calibration module 100 to buffer the received signal transmitted in the I channel; an I channel peak averaging unit 202 coupled to the I channel buffer unit 201 to perform peak averaging on the received signal stored in the I channel buffer unit 201 in a second preset time period to obtain an I channel amplitude value I_Vpp; a Q channel buffer unit 203 coupled to the Q channel at the front end of the DC offset estimation and calibration module 100 or a Q channel output end of the DC offset estimation and calibration module 100 to buffer the received signal transmitted in the Q channel; a Q channel peak averaging unit 204 coupled to the Q channel buffer unit 203 to perform peak averaging on the received signal stored in the Q channel buffer unit 203 in a second preset time period to obtain a Q channel amplitude value Q_Vpp; a divider unit 205, a first input end of the divider unit 205 is coupled to the I channel peak averaging unit 202, and a second input end of the divider unit 205 is coupled to the Q channel peak averaging unit 204, to divide the Q channel amplitude value Q_Vpp by the I channel amplitude value I_Vpp to obtain an amplitude compensation value AM_COMP, where AM_COMP=Q_Vpp/I_Vpp; and an amplitude compensation unit 206, a first input end of the amplitude compensation unit 206 is coupled to the I channel at the front end of the DC offset estimation and calibration module 100 or the I channel output end of the DC offset estimation and calibration module 100, or the first input end of the amplitude compensation unit 206 is coupled to the Q channel at the front end of the DC offset estimation and calibration module 100 or the Q channel output end of the DC offset estimation and calibration module 100, a second input end of the amplitude compensation unit 206 is coupled to the divider unit 205 to compensate the amplitude compensation value AM_COMP to the received signal in the I channel or the received signal in the Q channel, to achieve the amplitude mismatch calibration.

In this example, when the amplitude compensation value AM_COMP is compensated to the received signal of the I channel to achieve amplitude mismatch calibration, the first input end of the amplitude compensation unit 206 is coupled to the I channel at the front end of the DC offset estimation and calibration module 100 or the I channel output end of the DC offset estimation and calibration module 100, the second input end of the amplitude compensation unit 206 is coupled to the divider unit 205. When the amplitude compensation value AM_COMP is compensated to the received signal of the Q channel to achieve amplitude mismatch calibration, the first input end of the amplitude compensation unit 206 is coupled to the Q channel at the front end of the DC offset estimation and calibration module 100 or the Q channel output end of the DC offset estimation and calibration module 100, the second input end of the amplitude compensation unit 206 is coupled to the divider unit 205.

In this example, when the storage lengths of the I channel buffer unit 201 and the Q channel buffer unit 203 are sufficient, the calibration accuracy of amplitude mismatch can be improved by extending the length of the second preset time period. When the storage lengths of the I channel buffer unit 201 and the Q channel buffer unit 203 are insufficient to meet the extended storage, the calibration accuracy of amplitude mismatch can be improved by increasing the storage lengths of the I channel buffer unit 201 and the Q channel buffer unit 203 and extending the length of the second preset time period. However, it should be noted that the longer the second preset time period, the higher the calibration accuracy and the worse the timeliness of the calibration. Therefore, in practical applications, calibration accuracy and calibration timeliness need to be comprehensively considered. The actual communication protocol type needs to be considered to reasonably set the length of the second preset time period according to the actual bandwidth and data rate.

As an example, the amplitude mismatch estimation and calibration module 200 further includes: an averaging unit coupled between the divider unit 205 and the amplitude compensation unit 206 to average a plurality of amplitude compensation values AM_COMP to obtain a final amplitude compensation value. The amplitude mismatch calibration is performed by using the final amplitude compensation value to avoid random errors.

Correspondingly, this embodiment further provides an automatic mismatch calibration method. Compared with Embodiment 1, the automatic mismatch calibration method in this embodiment further includes performing an amplitude mismatch estimation and calibration operation at least once before or after the DC offset estimation and calibration operation. The amplitude mismatch estimation and calibration operation includes: estimating an amplitude mismatch of the received signals transmitted in the I channel and the Q channel to obtain an amplitude compensation value; and compensating the amplitude compensation value to the received signal in the I channel or the Q channel to achieve amplitude mismatch calibration.

In this example, the performed times of the DC offset estimation and calibration operation and the amplitude mismatch estimation and calibration operation may be the same or different. If the DC offset estimation and calibration operation and the amplitude mismatch estimation and calibration operation are both performed once, the amplitude mismatch estimation and calibration operation is performed before or after the DC offset estimation and calibration operation. If the DC offset estimation and calibration operation is performed once, and the amplitude mismatch estimation and calibration operation is performed for multiple times (that is, greater than or equal to 2 times). The multiple times of the amplitude mismatch estimation and calibration operations are all performed before the DC offset estimation and calibration operation, or are all performed after the DC offset estimation and calibration operation, or are partly performed before the DC offset estimation and calibration operation and partly performed after the DC offset estimation and calibration operation. If the DC offset estimation and calibration operation is performed for multiple times (that is, greater than or equal to 2 times), and the amplitude mismatch estimation and calibration operation is performed once. The amplitude mismatch estimation and calibration operation is performed before the first DC offset estimation and calibration operation, or is performed after the last DC offset estimation and calibration operation, or is performed between any two of the DC offset estimation and calibration operations.

If the DC offset estimation and calibration operation and the amplitude mismatch estimation and calibration operation are both performed for multiple times (that is, greater than or equal to 2 times), the multiple times of the amplitude mismatch estimation and calibration operations are all performed before any of the DC offset estimation and calibration operations, or are all performed after any of the DC offset estimation and calibration operations, or are distributed between any of the DC offset estimation and calibration operations. Preferably, when the DC offset estimation and calibration operation and the amplitude mismatch estimation and calibration operation are both performed multiple times (that is, greater than or equal to 2 times), the DC offset estimation and calibration operations and the amplitude mismatch estimation and calibration operations are performed alternately at intervals to repeat the DC offset calibration and amplitude mismatch calibration for multiple times on the received signal transmitted in the I channel and the Q channel, thereby improving the calibration accuracy. It should be noted that when the amplitude mismatch estimation and calibration operation is performed before the DC offset estimation and calibration operation, the received signal involved is an unprocessed received signal transmitted in the I channel and the Q channel. When the amplitude mismatch estimation and calibration operation is performed after the DC offset estimation and calibration operation, the received signal involved is the received signal transmitted in the I channel and the Q channel after being processed by the DC offset estimation and calibration operation.

As an example, the amplitude mismatch estimation and calibration operation includes: in a second preset time period, performing peak averaging on the received signals transmitted in the I channel and the Q channel respectively to obtain an I channel amplitude value and a Q channel amplitude value; dividing the Q channel amplitude value by the I channel amplitude value to obtain an amplitude compensation value, and finishing the amplitude mismatch estimation; and compensating the amplitude compensation value to the received signal in the I channel or the received signal in the Q channel to achieve the amplitude mismatch calibration.

In this example, the amplitude mismatch calibration accuracy can be improved by extending the length of the second preset time period, that is, the longer the second preset time period, the higher the calibration accuracy, but at the same time the worse the timeliness of the calibration. Therefore, in practical applications, calibration accuracy and calibration timeliness need to be comprehensively considered. The actual communication protocol type needs to be considered to reasonably set the length of the second preset time period according to the actual bandwidth and data rate.

As an example, the amplitude mismatch estimation and calibration operation further includes: repeating the method for obtaining the amplitude compensation value at least once, and averaging a plurality of amplitude compensation values to obtain a final amplitude compensation value. The amplitude mismatch calibration is performed by using the final amplitude compensation value to avoid random errors.

Embodiment 3

Figure 3:
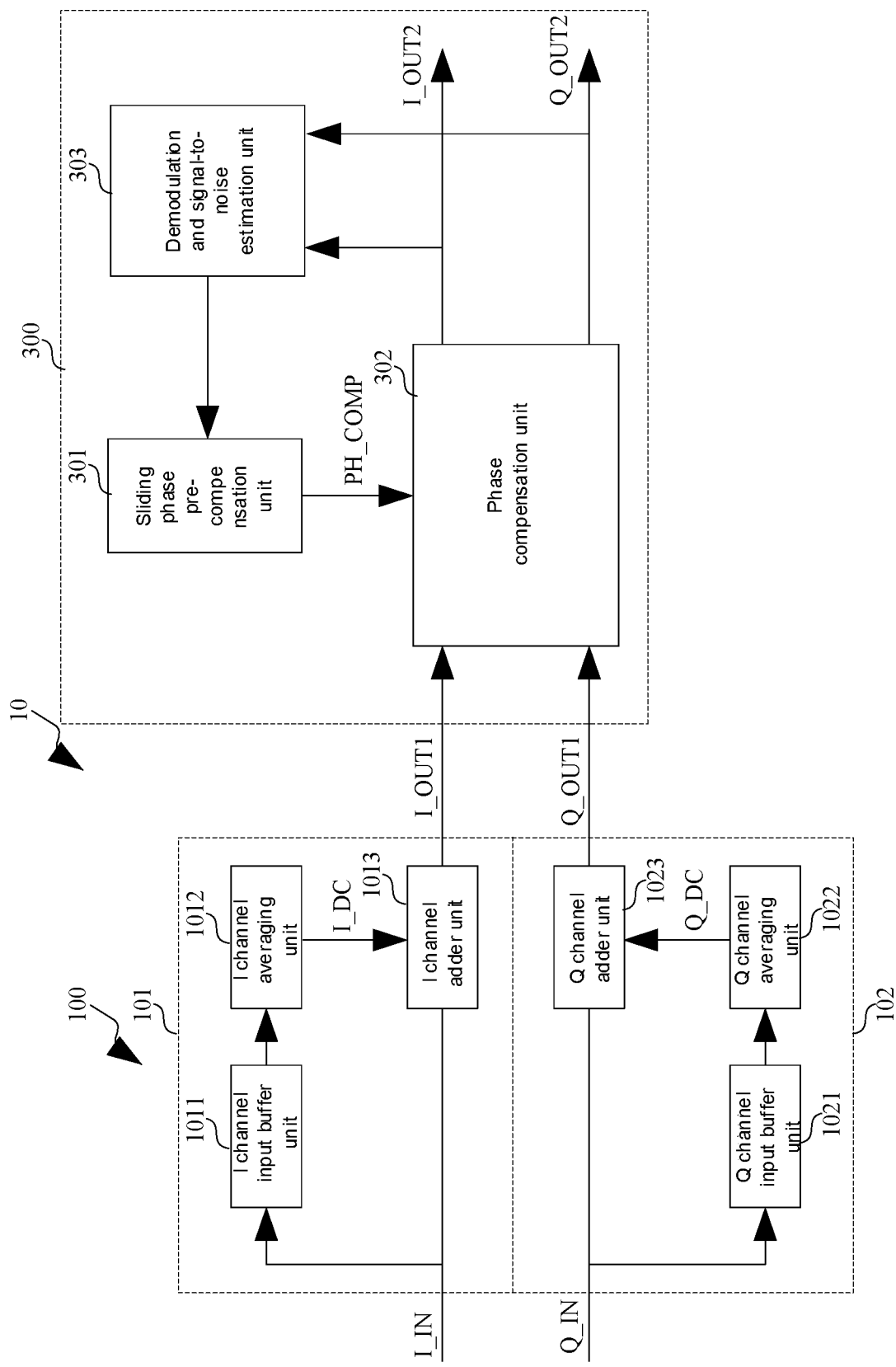
FIG. 3 shows a schematic diagram of an automatic mismatch calibration circuit according to Embodiment 3 of the present disclosure.

As shown in FIG. 3, this embodiment provides an automatic mismatch calibration circuit. Compared with Embodiment 1, the automatic mismatch calibration circuit 10 of this embodiment further includes: at least one phase mismatch estimation and calibration module 300 coupled between the RF receiver and the DC offset estimation and calibration module 100 or at the rear end of the DC offset estimation and calibration module 100 to adjust an initial phase compensation value based on a preset step within a preset sliding window to obtain phase compensation adjustment values and signal-to-noise ratios corresponding to the phase compensation adjustment values, and use a phase compensation adjustment value corresponding to an optimal signal-to-noise ratio as a phase compensation value to compensate to the received signals of the I channel and the Q channel to achieve phase mismatch calibration.

In this example, the number of the DC offset estimation and calibration module 100 and the phase mismatch estimation and calibration module 300 may be the same or different. If the number of the DC offset estimation and calibration module 100 and the phase mismatch estimation and calibration module are both one, the DC offset estimation and calibration module 100 is coupled to the rear end of the RF receiver, and the phase mismatch estimation and calibration module 300 is coupled between the RF receiver and the DC offset estimation and calibration module 100 or coupled to the rear end of the DC offset estimation and calibration module 100. If the number of the DC offset estimation and calibration module 100 is one, and the number of the phase mismatch estimation and calibration module 300 is multiple (that is, greater than or equal to two), the DC offset estimation and calibration module 100 is coupled to the rear end of the RF receiver, a plurality of the phase mismatch estimation and calibration modules 300 are all coupled between the RF receiver and the DC offset estimation and calibration module 100, or are all coupled to the rear end of the DC offset estimation and calibration module 100, or are partly coupled between the RF receiver and the DC offset estimation and calibration module 100 and partly coupled to the rear end of the DC offset estimation and calibration module 100.

If the number of the DC offset estimation and calibration module 100 is multiple (i.e. greater than or equal to 2), and the number of the phase mismatch estimation and calibration module 300 is one, the multiple DC offset estimation and calibration modules 100 are all coupled to the rear end of the RF receiver, the phase mismatch estimation and calibration module 300 is coupled to the front end of the first one of the DC offset estimation and calibration modules 100, or coupled to the rear end of the last one of the DC offset estimation and calibration modules 100, or coupled between any two of the DC offset estimation and calibration modules 100. If the number of the DC offset estimation and calibration module 100 and the number of the phase mismatch estimation and calibration module 300 are both multiple (i.e. greater than or equal to 2), the multiple DC offset estimation and calibration modules 100 are all coupled to the rear end of the RF receiver, and the multiple phase mismatch estimation and calibration modules 300 are all coupled to the front end of any one of the DC offset estimation and calibration modules 100, or all are coupled to the rear end of any one of the DC offset estimation and calibration modules 100, or are arbitrarily interspersed between the DC offset estimation and calibration modules 100.

Preferably, when the number of the DC offset estimation and calibration module 100 and the phase mismatch estimation and calibration module 300 are both multiple (i.e. greater than or equal to 2), the DC offset estimation and calibration modules 100 and the phase mismatch estimation and calibration modules 300 are alternately arranged at intervals to perform multiple DC offset calibrations and phase mismatch calibrations on the received signals transmitted in the I channel and the Q channel, thereby improving the calibration accuracy. It should be noted that when the phase mismatch estimation and calibration module 300 is coupled between the RF receiver and the DC offset estimation and calibration module 100, the received signal involved in the phase mismatch estimation and calibration module 300 is the received signal transmitted in the I channel and Q channel of the RF receiver. When the phase mismatch estimation and calibration module 300 is coupled to the rear end of the DC offset estimation and calibration module 100, the received signal involved in the phase mismatch estimation and calibration module 300 is the received signal output from an I channel output end and a Q channel output end of the DC offset estimation and calibration module 100.

As an example, as shown in FIG. 3, the phase mismatch estimation and calibration module 300 includes: a sliding phase pre-compensation unit 301 to provide the initial phase compensation value, adjust the initial phase compensation value based on the preset step within the preset sliding window to obtain the phase compensation adjustment values, and select the optimal signal-to-noise ratio from the signal-to-noise ratios, and use the phase compensation adjustment value corresponding to the optimal signal-to-noise ratio as the phase compensation value; a phase compensation unit 302, a first input end of the phase compensation unit 302 is coupled to the I channel at the front end of the DC offset estimation and calibration module 100 or the I channel output end of the DC offset estimation and calibration module 100, a second input end of the phase compensation unit 302 is coupled to the Q channel at the front end of the DC offset estimation and calibration module 100 or the Q channel output end of the DC offset estimation and calibration module 100, and a third input end of the phase compensation unit 302 is coupled to the sliding phase pre-compensation unit 301 to sequentially compensate the initial phase compensation value and the phase compensation adjustment values to the received signals in the I channel and the Q channel, and compensate the phase compensation value to the received signals in the I channel and the Q channel to achieve the phase mismatch calibration; and a demodulation and signal-to-noise ratio estimation unit 303 coupled between the phase compensation unit 302 and the sliding phase pre-compensation unit 301 to demodulate and estimate a signal-to-noise ratio of an output of the phase compensation unit to obtain the signal-to-noise ratio corresponding to a current phase.

In this example, the sliding phase pre-compensation unit 301, the phase compensation unit 302, and the demodulation and signal-to-noise ratio estimation unit 303 form a feedback loop to use feedback convergence to obtain a phase compensation value, thereby achieving phase mismatch calibration. In specific implementation, the initial phase compensation value is usually set to 0, which indicates that there is no phase mismatch. Then, a sliding scanning method is used to detect the received signal-to-noise ratio under different phase compensations, so as to obtain the phase compensation corresponding to the optimal received signal-to-noise ratio, that is, the phase compensation value. For example, different phase compensation adjustment values PH_COMP and the corresponding received signal-to-noise ratios are obtained by gradually increasing from the initial phase compensation value 0 with a preset step length (such as 0.1 degree). Then different phase compensation adjustment values PH_COMP and the corresponding received signal-to-noise ratios are obtained by gradually decreasing from the initial phase compensation value 0 with a preset step length (such as 0.1 degree). The phase compensation corresponding to the optimal received signal-to-noise ratio, that is, the phase compensation value, is obtained within the preset sliding window.

Correspondingly, this embodiment further provides an automatic mismatch calibration method. Compared with Embodiment 1, the automatic mismatch calibration method in this embodiment further includes: performing phase mismatch estimation and calibration operation at least once before or after the DC offset estimation and calibration operation. The phase mismatch estimation and calibration operation includes: adjusting an initial phase compensation value based on a preset step within a preset sliding window to obtain phase compensation adjustment values and signal-to-noise ratios corresponding to the phase compensation adjustment values, and using a phase compensation adjustment value corresponding to an optimal signal-to-noise ratio as a phase compensation value to compensate to the received signals of the I channel and the Q channel to achieve phase mismatch calibration.

In this example, the performed times of the DC offset estimation and calibration operation and the phase mismatch estimation and calibration operation may be the same or different. If the DC offset estimation and calibration operation and the phase mismatch estimation and calibration operation are both performed once, the phase mismatch estimation and calibration operation is performed before or after the DC offset estimation and calibration operation. If the DC offset estimation and calibration operation is performed once, and the phase mismatch estimation and calibration operation is performed for multiple times (that is, greater than or equal to 2 times). The multiple times of the phase mismatch estimation and calibration operations are all performed before the DC offset estimation and calibration operation, or are all performed after the DC offset estimation and calibration operation, or are partly performed before the DC offset estimation and calibration operation and partly performed after the DC offset estimation and calibration operation.

If the DC offset estimation and calibration operation is performed for multiple times (that is, greater than or equal to 2 times), and the phase mismatch estimation and calibration operation is performed once. The phase mismatch estimation and calibration operation is performed before the first DC offset estimation and calibration operation, or is performed after the last DC offset estimation and calibration operation, or is performed between any two of the DC offset estimation and calibration operations. If the DC offset estimation and calibration operation and the phase mismatch estimation and calibration operation are both performed for multiple times (that is, greater than or equal to 2 times), the multiple times of the phase mismatch estimation and calibration operations are all performed before any of the DC offset estimation and calibration operations, or are all performed after any of the DC offset estimation and calibration operations, or are distributed and performed between any of the DC offset estimation and calibration operations.

Preferably, when the DC offset estimation and calibration operation and the phase mismatch estimation and calibration operation are both performed multiple times (that is, greater than or equal to 2 times), the DC offset estimation and calibration operations and the phase mismatch estimation and calibration operations are performed alternately at intervals to repeat the DC offset calibration and phase mismatch calibration for multiple times on the received signal transmitted in the I channel and the Q channel, thereby improving the calibration accuracy. It should be noted that when the phase mismatch estimation and calibration operation is performed before the DC offset estimation and calibration operation, the received signal involved is an unprocessed received signal transmitted in the I channel and the Q channel. When the phase mismatch estimation and calibration operation is performed after the DC offset estimation and calibration operation, the received signal involved is the received signal transmitted in the I channel and the Q channel after being processed by the DC offset estimation and calibration operation.

As an example, a the phase mismatch estimation and calibration operation includes: providing an initial phase compensation value, compensating the initial phase compensation value to the received signals transmitted in the I channel and the Q channel, and demodulating and estimating the signal-to-noise ratios of the received signals transmitted in the I channel and the Q channel after compensation; adjusting an initial phase compensation value based on a preset step within a preset sliding window to obtain phase compensation adjustment values, sequentially compensating the phase compensation adjustment values to the received signals in the I channel and the Q channel, and sequentially demodulating and estimating the signal-to-noise ratios of the received signals transmitted in the I channel and the Q channel after compensation; and selecting the optimal signal-to-noise ratio from the signal-to-noise ratios, and using a phase compensation adjustment value corresponding to the optimal signal-to-noise ratio as a phase compensation value to compensate to the received signals transmitted in the I channel and the Q channel to achieve phase mismatch calibration.

In this example, the phase mismatch estimation and calibration operation is a feedback process to obtain a phase compensation value by using feedback convergence, so as to achieve phase mismatch calibration. In specific implementation, the initial phase compensation value is usually set to 0, which indicates that there is no phase mismatch. Then, a sliding scanning method is used to detect the received signal-to-noise ratio under different phase compensations, so as to obtain the phase compensation corresponding to the optimal received signal-to-noise ratio, that is, the phase compensation value. For example, different phase compensation adjustment values PH_COMP and the corresponding received signal-to-noise ratios are obtained by gradually increasing from the initial phase compensation value 0 with a preset step length (such as 0.1 degree). Then different phase compensation adjustment values PH_COMP and the corresponding received signal-to-noise ratios are obtained by gradually decreasing from the initial phase compensation value 0 with a preset step length (such as 0.1 degree). The phase compensation corresponding to the optimal received signal-to-noise ratio, that is, the phase compensation value, is obtained within the preset sliding window.

Embodiment 4

Figure 4:
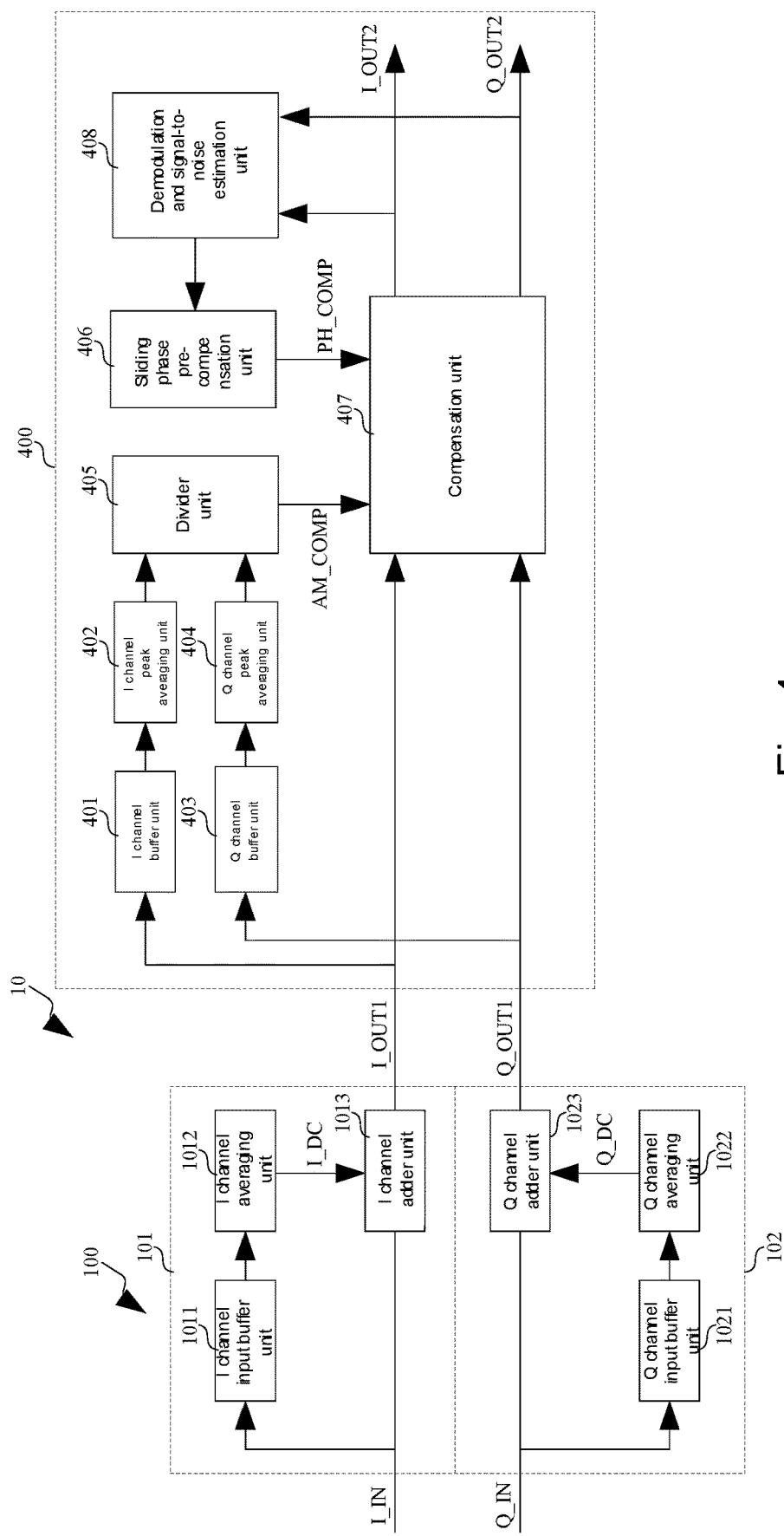
FIG. 4 shows a schematic diagram of an automatic mismatch calibration circuit according to Embodiment 4 of the present disclosure.

As shown in FIG. 4, this embodiment provides an automatic mismatch calibration circuit. Compared with Embodiment 1, the automatic mismatch calibration circuit 10 in this embodiment further includes: at least one quadrature mismatch estimation and calibration module 400 coupled between the RF receiver and the DC offset estimation and calibration module 100 or at the rear end of the DC offset estimation and calibration module 100 to estimate an amplitude mismatch of the received signals transmitted in the I channel and the Q channel to obtain an amplitude compensation value, compensate the amplitude compensation value to the received signal in the I channel or the Q channel, adjust an initial phase compensation value based on a preset step within a preset sliding window to obtain phase compensation adjustment values, sequentially compensate the initial phase compensation value and the phase compensation adjustment values to the received signals in the I channel and the Q channel, estimate a signal-to-noise ratio of the compensated received signals to obtain signal-to-noise ratios corresponding to phases, and use the phase compensation adjustment value corresponding to an optimal signal-to-noise ratio as a phase compensation value to compensate to the received signals of the I channel and the Q channel to achieve quadrature mismatch calibration (including amplitude mismatch calibration and phase mismatch calibration).

It should be noted that since it is impossible to predetermine what kind of circuit mismatch will exist in the received signal transmitted in the I channel and Q channel of the RF receiver, in practical applications, the automatic mismatch calibration circuit described in this example is usually added to the rear end of the RF receiver so that it can perform DC offset calibration and quadrature mismatch calibration on the received signals in the I channel and Q channel under normal conditions. In practical applications, if there is only a DC offset in the received signals transmitted in the I channel and Q channel of the RF receiver, the amplitude compensation value and phase compensation value can be set to 0 to make the automatic mismatch calibration circuit described in this example only perform DC offset calibration. If the received signals transmitted in the I channel and Q channel of the RF receiver only have DC offset and amplitude mismatch, the phase compensation value can be set to 0, so that the automatic mismatch calibration circuit described in this example only performs DC offset calibration and amplitude mismatch calibration. If the received signals transmitted in the I channel and Q channel of the RF receiver only have DC offset and phase mismatch, then the amplitude compensation value can be set to 0, so that the automatic mismatch calibration circuit described in this example only performs DC offset calibration and phase mismatch calibration.

In this example, the number of the DC offset estimation and calibration module 100 and the quadrature mismatch estimation and calibration module 400 may be the same or different. If the number of the DC offset estimation and calibration module 100 and the quadrature mismatch estimation and calibration module 400 are both one, the DC offset estimation and calibration module 100 is coupled to the rear end of the RF receiver, and the quadrature mismatch estimation and calibration module 400 is coupled between the RF receiver and the DC offset estimation and calibration module 100 or coupled to the rear end of the DC offset estimation and calibration module 100. If the number of the DC offset estimation and calibration module 100 is one, and the number of the quadrature mismatch estimation and calibration module 400 is multiple (that is, greater than or equal to two), the DC offset estimation and calibration module 100 is coupled to the rear end of the RF receiver, a plurality of the quadrature mismatch estimation and calibration modules 400 are all coupled between the RF receiver and the DC offset estimation and calibration module 100, or are all coupled to the rear end of the DC offset estimation and calibration module 100, or are partly coupled between the RF receiver and the DC offset estimation and calibration module 100 and partly coupled to the rear end of the DC offset estimation and calibration module 100.

If the number of the DC offset estimation and calibration module 100 is multiple (i.e. greater than or equal to 2), and the number of the quadrature mismatch estimation and calibration module 400 is one, the multiple DC offset estimation and calibration modules 100 are all coupled to the rear end of the RF receiver, the quadrature mismatch estimation and calibration module 400 is coupled to the front end of the first one of the DC offset estimation and calibration modules 100, or coupled to the rear end of the last one of the DC offset estimation and calibration modules 100, or coupled between any two of the DC offset estimation and calibration modules 100. If the number of the DC offset estimation and calibration module 100 and the number of the quadrature mismatch estimation and calibration module 400 are both multiple (i.e. greater than or equal to 2), the multiple DC offset estimation and calibration modules 100 are all coupled to the rear end of the RF receiver, and the multiple quadrature mismatch estimation and calibration modules 400 are all coupled to the front end of any one of the DC offset estimation and calibration modules 100, or are all coupled to the rear end of any one of the DC offset estimation and calibration modules 100, or are arbitrarily interspersed between the DC offset estimation and calibration modules 100.

Preferably, when the number of the DC offset estimation and calibration module 100 and the quadrature mismatch estimation and calibration module 400 are both multiple (i.e. greater than or equal to 2), the DC offset estimation and calibration modules 100 and the quadrature mismatch estimation and calibration modules 400 are alternately arranged at intervals to perform multiple DC offset calibrations and quadrature mismatch calibrations on the received signals transmitted in the I channel and the Q channel, thereby improving the calibration accuracy. It should be noted that when the quadrature mismatch estimation and calibration module 400 is coupled between the RF receiver and the DC offset estimation and calibration module 100, the received signal involved in the quadrature mismatch estimation and calibration module 400 is the received signal transmitted in the I channel and Q channel of the RF receiver. When the quadrature mismatch estimation and calibration module 400 is coupled to the rear end of the DC offset estimation and calibration module 100, the received signal involved in the quadrature mismatch estimation and calibration module 400 is the received signal output from an I channel output end and a Q channel output end of the DC offset estimation and calibration module 100.

As an example, as shown in FIG. 4, the quadrature mismatch estimation and calibration module 400 includes: an I channel buffer unit 401 coupled to the I channel at a front end of the DC offset estimation and calibration module 100 or an I channel output end of the DC offset estimation and calibration module 100 to buffer the received signal transmitted in the I channel; an I channel peak averaging unit 402 coupled to the I channel buffer unit 401 to perform peak averaging on the received signal stored in the I channel buffer unit 401 in a second preset time period to obtain an I channel amplitude value; a Q channel buffer unit 403 coupled to the Q channel at the front end of the DC offset estimation and calibration module 100 or a Q channel output end of the DC offset estimation and calibration module 100 to buffer the received signal transmitted in the Q channel; a Q channel peak averaging unit 404 coupled to the Q channel buffer unit 403 to perform peak averaging on the received signal stored in the Q channel buffer unit 403 in a second preset time period to obtain a Q channel amplitude value; a divider unit 405, a first input end of the divider unit 405 is coupled to the I channel peak averaging unit 402, and a second input end of the divider unit 405 is coupled to the Q channel peak averaging unit 404, to divide the Q channel amplitude value by the I channel amplitude value to obtain an amplitude compensation value; a sliding phase pre-compensation unit 406 to provide the initial phase compensation value, adjust the initial phase compensation value based on the preset step within the preset sliding window to obtain the phase compensation adjustment values, and select the optimal signal-to-noise ratio from the signal-to-noise ratios, and use the phase compensation adjustment value corresponding to the optimal signal-to-noise ratio as the phase compensation value; a compensation unit 407, a first input end of the compensation unit 407 is coupled to the I channel at the front end of the DC offset estimation and calibration module 100 or the I channel output end of the DC offset estimation and calibration module 100, a second input end of the compensation unit 407 is coupled to the Q channel at the front end of the DC offset estimation and calibration module 100 or the Q channel output end of the DC offset estimation and calibration module 100, a third input end of the compensation unit 407 is coupled to the divider unit 405, and a fourth input end of the compensation unit 407 is coupled to the sliding phase pre-compensation unit 406 to compensate the amplitude compensation value to the received signal in the I channel or the received signal in the Q channel, sequentially compensate the initial phase compensation value and the phase compensation adjustment values to the received signals in the I channel and the Q channel, and compensate the phase compensation value to the received signals in the I channel and the Q channel to achieve amplitude and phase mismatch calibration; and a demodulation and signal-to-noise ratio estimation unit 408 coupled between the compensation unit 407 and the sliding phase pre-compensation unit 406 to demodulate and estimate a signal-to-noise ratio of an output of the compensation unit to obtain the signal-to-noise ratio corresponding to a current phase.

In this example, when performing amplitude mismatch calibration on the received signal of the I channel, the output of the divider unit 405 is added to the received signal of the I channel through the compensation unit 407. When performing amplitude mismatch calibration on the received signal of the Q channel, the output of the divider unit 405 is added to the received signal of the Q channel through the compensation unit 407.

In this example, when the storage lengths of the I channel buffer unit 401 and the Q channel buffer unit 403 are sufficient, the calibration accuracy of amplitude mismatch can be improved by extending the length of the second preset time period. When the storage lengths of the I channel buffer unit 401 and the Q channel buffer unit 403 are insufficient to meet the extended storage, the calibration accuracy of amplitude mismatch can be improved by increasing the storage lengths of the I channel buffer unit 401 and the Q channel buffer unit 403 and extending the length of the second preset time period. However, it should be noted that the longer the second preset time period, the higher the calibration accuracy and the worse the timeliness of the calibration. Therefore, in practical applications, calibration accuracy and calibration timeliness need to be comprehensively considered. The actual communication protocol type needs to be considered to reasonably set the length of the second preset time period according to the actual bandwidth and data rate.

In this example, the sliding phase pre-compensation unit 406, the compensation unit 407, and the demodulation and signal-to-noise ratio estimation unit 408 form a feedback loop to use feedback convergence to obtain a phase compensation value, thereby achieving phase mismatch calibration. In specific implementation, the initial phase compensation value is usually set to 0, which indicates that there is no phase mismatch. Then, a sliding scanning method is used to detect the received signal-to-noise ratio (the received signal-to-noise ratio at this time has been amplitude compensated, that is, each time the phase compensation is performed by the compensation unit 407, the amplitude compensation is also performed) under different phase compensations, so as to obtain the phase compensation corresponding to the optimal received signal-to-noise ratio, that is, the phase compensation value. For example, different phase compensation adjustment values PH_COMP and the corresponding received signal-to-noise ratios are obtained by gradually increasing from the initial phase compensation value 0 with a preset step length (such as 0.1 degree). Then different phase compensation adjustment values PH_COMP and the corresponding received signal-to-noise ratios are obtained by gradually decreasing from the initial phase compensation value 0 with a preset step length (such as 0.1 degree). The phase compensation corresponding to the optimal received signal-to-noise ratio, that is, the phase compensation value, is obtained within the preset sliding window.

Figure 5:
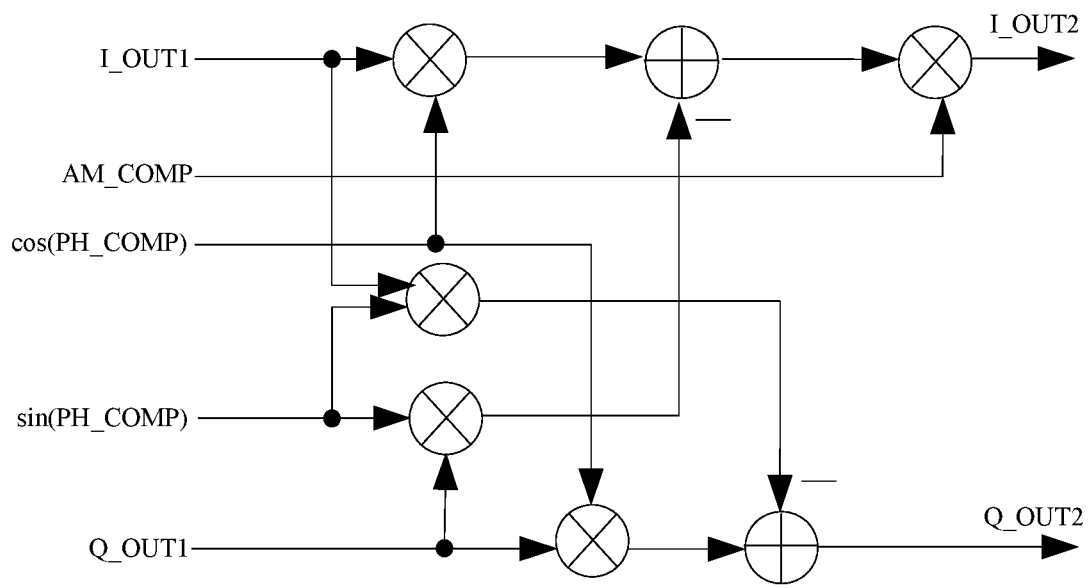
FIG. 5 shows a specific circuit diagram of a compensation unit according to Embodiment 4 of the present disclosure.

Specifically, the compensation unit 407 can be implemented by a variety of circuits. One of the specific implementation circuits is shown in FIG. 5. I_OUT1 and Q_OUT1, the sine and cosine of the amplitude compensation value AM_COMP and the phase compensation value PH_COMP are input, and I_OUT2 and Q_OUT2 are output. The output signal after quadrature mismatch calibration is:

$$I\_OUT2 = [I\_OUT1 * \cos(PH\_COMP) - Q\_OUT1 * \sin(PH\_COMP)] * AM\_COMP.$$

$$Q\_OUT2 = Q\_OUT1 * \cos(PH\_COMP) - I\_OUT1 * \sin(PH\_COMP).$$

Further, when the specific implementation circuit of the compensation unit 407 is shown in FIG. 5, the quadrature mismatch estimation and calibration module 400 further includes: a sine operation unit and a cosine operation unit, which are respectively coupled between the sliding phase pre-compensation unit 406 and the compensation unit 407, to perform a sine operation and a cosine operation on the phase compensation value PH_COMP, respectively.

As an example, the quadrature mismatch estimation and calibration module 400 further includes: an averaging unit coupled between the divider unit 405 and the compensation unit 407 to average a plurality of amplitude compensation values to obtain a final amplitude compensation value. The amplitude mismatch calibration is performed by using the final amplitude compensation value to avoid random errors.

Correspondingly, this embodiment further provides an automatic mismatch calibration method. Compared with Embodiment 1, the automatic mismatch calibration method in this embodiment further includes performing quadrature mismatch estimation and calibration operation at least once before or after the DC offset estimation and calibration operation. The quadrature mismatch estimation and calibration operation includes: estimating an amplitude mismatch of the received signals transmitted in the I channel and the Q channel, and adjusting the initial phase compensation value based on the preset step within the preset sliding window to obtain the phase compensation adjustment values; compensating the amplitude compensation value to the received signal in the I channel or the Q channel, and sequentially compensating the initial phase compensation value and the phase compensation adjustment values to the received signals in the I channel and the Q channel; and demodulating and estimating the signal-to-noise ratios of the received signals transmitted in the I channel and the Q channel after compensation, and using a phase compensation adjustment value corresponding to the optimal signal-to-noise ratio as a phase compensation value to compensate to the received signals in the I channel and the Q channel to achieve quadrature mismatch calibration.

In this example, the performed times of the DC offset estimation and calibration operation and the quadrature mismatch estimation and calibration operation may be the same or different. If the DC offset estimation and calibration operation and the quadrature mismatch estimation and calibration operation are both performed once, the quadrature mismatch estimation and calibration operation is performed before or after the DC offset estimation and calibration operation. If the DC offset estimation and calibration operation is performed once, and the quadrature mismatch estimation and calibration operation is performed for multiple times (that is, greater than or equal to 2 times). The multiple times of the quadrature mismatch estimation and calibration operations are all performed before the DC offset estimation and calibration operation, or are all performed after the DC offset estimation and calibration operation, or are partly performed before the DC offset estimation and calibration operation and partly performed after the DC offset estimation and calibration operation.

If the DC offset estimation and calibration operation is performed for multiple times (that is, greater than or equal to 2 times), and the quadrature mismatch estimation and calibration operation is performed once. The quadrature mismatch estimation and calibration operation is performed before the first DC offset estimation and calibration operation, or is performed after the last DC offset estimation and calibration operation, or is performed between any two of the DC offset estimation and calibration operations. If the DC offset estimation and calibration operation and the quadrature mismatch estimation and calibration operation are both performed for multiple times (that is, greater than or equal to 2 times), the multiple times of the quadrature mismatch estimation and calibration operations are all performed before any of the DC offset estimation and calibration operations, or are all performed after any of the DC offset estimation and calibration operations, or are distributed and performed between any of the DC offset estimation and calibration operations.

Preferably, when the DC offset estimation and calibration operation and the quadrature mismatch estimation and calibration operation are both performed multiple times (that is, greater than or equal to 2 times), the DC offset estimation and calibration operations and the quadrature mismatch estimation and calibration operations are performed alternately at intervals to repeat the DC offset calibration and quadrature mismatch calibration for multiple times on the received signal transmitted in the I channel and the Q channel, thereby improving the calibration accuracy. It should be noted that when the quadrature mismatch estimation and calibration operation is performed before the DC offset estimation and calibration operation, the received signal involved is an unprocessed received signal transmitted in the I channel and the Q channel. When the quadrature mismatch estimation and calibration operation is performed after the DC offset estimation and calibration operation, the received signal involved is the received signal transmitted in the I channel and the Q channel after being processed by the DC offset estimation and calibration operation.

As an example, a specific implementation method of the quadrature mismatch estimation and calibration operation includes: in a second preset time period, performing peak averaging on the received signals transmitted in the I channel and the Q channel respectively to obtain an I channel amplitude value and a Q channel amplitude value; dividing the Q channel amplitude value by the I channel amplitude value to obtain an amplitude compensation value, and finishing the amplitude mismatch estimation; and compensating the amplitude compensation value to the received signal in the I channel or the received signal in the Q channel, compensating the initial phase compensation value to the received signals in the I channel and the Q channel, and demodulating and estimating the signal-to-noise ratios of the received signals transmitted in the I channel and the Q channel after compensation; adjusting the initial phase compensation value based on the preset step within the preset sliding window to obtain the phase compensation adjustment values; compensating the amplitude compensation value to the received signal in the I channel or the received signal in the Q channel, sequentially compensating the phase compensation adjustment values to the received signals in the I channel and the Q channel, and sequentially demodulating and estimating the signal-to-noise ratios of the received signals in the I channel and the Q channel after compensation; and selecting the optimal signal-to-noise ratio from the signal-to-noise ratios, and using a phase compensation adjustment value corresponding to the optimal signal-to-noise ratio as a phase compensation value, compensating the amplitude compensation value to the received signal in the I channel or the received signal in the Q channel, and compensating the phase compensation value to the received signals in the I channel and the Q channel to achieve quadrature mismatch calibration.

In this example, the amplitude mismatch calibration accuracy can be improved by extending the length of the second preset time period, that is, the longer the second preset time period, the higher the calibration accuracy, but at the same time the worse the timeliness of the calibration. Therefore, in practical applications, calibration accuracy and calibration timeliness need to be comprehensively considered. The actual communication protocol type needs to be considered to reasonably set the length of the second preset time period according to the actual bandwidth and data rate.

In this example, the specific implementation method of the phase mismatch estimation and calibration operation is a feedback process to obtain a phase compensation value by using feedback convergence, so as to achieve phase mismatch calibration. In specific implementation, the initial phase compensation value is usually set to 0, which indicates that there is no phase mismatch. Then, a sliding scanning method is used to detect the received signal-to-noise ratio (the received signal-to-noise ratio at this time has been amplitude compensated, that is, each time the phase compensation is performed by the compensation unit 407, the amplitude compensation is also performed) under different phase compensations, so as to obtain the phase compensation corresponding to the optimal received signal-to-noise ratio, that is, the phase compensation value. For example, start from 0 and gradually increase with a preset step length (such as 0.1 degree) to obtain different phase compensation adjustment values PH_COMP and the corresponding received signal-to-noise ratios, and then gradually decrease from 0 with a preset step length (such as 0.1 degree) to obtain different phase compensation adjustment values PH_COMP and the corresponding received signal-to-noise ratios, the phase compensation corresponding to the optimal received signal-to-noise ratio, that is, the phase compensation value is obtained within the preset sliding window.

As an example, a specific implementation method of the quadrature mismatch estimation and calibration operation further includes: repeating the method for obtaining the amplitude compensation value at least once, and averaging a plurality of amplitude compensation values to obtain a final amplitude compensation value. The amplitude mismatch calibration is performed by using the final amplitude compensation value to avoid random errors.

Embodiment 5

Figure 6:
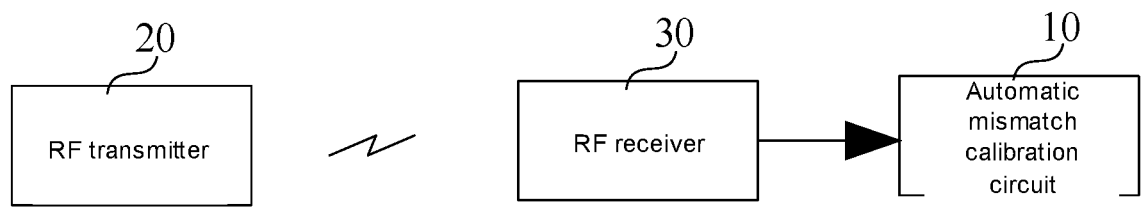
FIG. 6 shows a schematic diagram of an RF receiver system according to Embodiment 5 of the present disclosure.

As shown in FIG. 6, the present embodiment provides an RF receiver system, including: an RF transmitter 20, an RF receiver 30, and the automatic mismatch calibration circuit 10 as in any one of Embodiment 1 to Embodiment 4, the automatic mismatch calibration circuit 10 is coupled to the rear end of the RF receiver 30. The RF transmitter 20 and the RF receiver 30 realize communication based on a wireless connection.

In this example, the automatic mismatch calibration circuit 10 is set at the rear end of the RF receiver 30 to perform DC offset calibration, DC offset calibration and amplitude mismatch calibration, DC offset calibration and phase mismatch calibration, or DC offset calibration and quadrature mismatch calibration on the received signals transmitted in the I channel and Q channel at the rear end of the RF receiver 30, so as to improve the reception signal-to-noise ratio and demodulation performance of the RF receiver.

In summary, the automatic mismatch calibration circuit and method, and the radio frequency receiver system of the present disclosure improves the received signal-to-noise ratio and demodulation performance of the system by performing DC offset estimation and calibration, DC offset estimation and calibration and amplitude mismatch estimation and calibration, DC offset estimation and calibration and phase mismatch estimation and calibration, or DC offset estimation and calibration and quadrature mismatch estimation and calibration. The calibration process of the present disclosure may be performed before or after the communication, interrupt the communication, or may be performed during the communication. When the DC offset calibration is performed during the communication process, there is no need to take up time other than the communication, which not only reduces the effective working time of the system, but also reduces the average power consumption of the system, thereby meeting the needs of low-power consumption. Therefore, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those skilled in the art without departing from the spirit and scope of the disclosure will be covered by the appended claims.

We claim:

1. An automatic mismatch calibration circuit, comprising:
   at least one direct current (DC) offset estimation and calibration module coupled to a rear end of a radio frequency (RF) receiver to estimate a DC offset of received signals transmitted in an I channel and a Q channel to obtain an I-channel-DC-component and a Q-channel-DC-component, and compensate the I-channel-DC-component and the Q-channel-DC-component to the received signals corresponding to the I channel and the Q channel to achieve DC offset calibration,
   wherein the DC offset estimation and calibration module comprises:
   an I channel DC offset estimation and calibration part, including:
   an I channel input buffer unit coupled to the I channel at the rear end of the RF receiver to buffer the received signal transmitted in the I channel,
   an I channel averaging unit coupled to the I channel input buffer unit to perform time-domain averaging on the received signal stored in the I channel input buffer unit in a first preset time period to obtain the I-channel-DC-component, and
   an I channel adder unit, a first input end of the I channel adder unit is coupled to the I channel at the rear end of the RF receiver, and a second input end of the I channel adder unit is coupled to the I channel averaging unit, to perform a subtraction operation on the received signal transmitted in the I channel and the I-channel-DC-component to achieve the DC offset calibration of the received signal transmitted in the I channel; and
   a Q channel DC offset estimation and calibration part, including:
   a Q channel input buffer unit coupled to the Q channel at the rear end of the RF receiver to buffer the received signal transmitted in the Q channel,
   a Q channel averaging unit coupled to the Q channel input buffer unit to perform time-domain averaging on the received signal stored in the Q channel input buffer unit in a first preset time period to obtain the Q-channel-DC-component, and
   a Q channel adder unit, a first input end of the Q channel adder unit is coupled to the Q channel at the rear end of the RF receiver, and a second input end of the Q channel adder unit is coupled to the Q channel averaging unit, to perform a subtraction operation on the received signal transmitted in the Q channel and the Q-channel-DC-component to achieve the DC offset calibration of the received signal transmitted in the Q channel.

2. The automatic mismatch calibration circuit according to claim 1, further comprising: at least one amplitude mismatch estimation and calibration module coupled between the RF receiver and the DC offset estimation and calibration module or at the rear end of the DC offset estimation and calibration module, to estimate an amplitude mismatch of the received signals transmitted in the I channel and the Q channel to obtain an amplitude compensation value, and then compensate the amplitude compensation value to the received signal in the I channel or the Q channel to achieve amplitude mismatch calibration.

3. The automatic mismatch calibration circuit according to claim 2, wherein the amplitude mismatch estimation and calibration module comprises:
    an I channel buffer unit coupled to the I channel at a front end of the DC offset estimation and calibration module or an I channel output end of the DC offset estimation and calibration module to buffer the received signal transmitted in the I channel;
    an I channel peak averaging unit coupled to the I channel buffer unit to perform peak averaging on the received signal stored in the I channel buffer unit in a second preset time period to obtain an I channel amplitude value;
    a Q channel buffer unit coupled to the Q channel at the front end of the DC offset estimation and calibration module or a Q channel output end of the DC offset estimation and calibration module to buffer the received signal transmitted in the Q channel;
    a Q channel peak averaging unit coupled to the Q channel buffer unit to perform peak averaging on the received signal stored in the Q channel buffer unit in a second preset time period to obtain a Q channel amplitude value;
    a divider unit, a first input end of the divider unit is coupled to the I channel peak averaging unit, and a second input end of the divider unit is coupled to the Q channel peak averaging unit, to divide the Q channel amplitude value and the I channel amplitude value to obtain an amplitude compensation value; and
    an amplitude compensation unit, a first input end of the amplitude compensation unit is coupled to the I channel at the front end of the DC offset estimation and calibration module or the I channel output end of the DC offset estimation and calibration module, or the first input end of the amplitude compensation unit is coupled to the Q channel at the front end of the DC offset estimation and calibration module or the Q channel output end of the DC offset estimation and calibration module, a second input end of the amplitude compensation unit is coupled to the divider unit to compensate the amplitude compensation value to the received signal in the I channel or the received signal in the Q channel, to achieve the amplitude mismatch calibration.

4. The automatic mismatch calibration circuit according to claim 3, wherein the amplitude mismatch estimation and calibration module further comprises:
    an averaging unit coupled between the divider unit and the amplitude compensation unit to average a plurality of amplitude compensation values to obtain a final amplitude compensation value.

5. The automatic mismatch calibration circuit according to claim 2, wherein when a number of the DC offset estimation and calibration module and the amplitude mismatch estimation and calibration module is multiple, the DC offset estimation and calibration modules and the amplitude mismatch estimation and calibration modules are arranged alternately at intervals.

6. The automatic mismatch calibration circuit according to claim 1, further comprising: at least one phase mismatch estimation and calibration module coupled between the RF receiver and the DC offset estimation and calibration module or at the rear end of the DC offset estimation and calibration module to adjust an initial phase compensation value based on a preset step within a preset sliding window to obtain phase compensation adjustment values and signal-to-noise ratios corresponding to the phase compensation adjustment values, and use a phase compensation adjustment value corresponding to an optimal signal-to-noise ratio as a phase compensation value to compensate to the received signals of the I channel and the Q channel to achieve phase mismatch calibration.

7. The automatic mismatch calibration circuit according to claim 6, wherein the phase mismatch estimation and calibration module comprises:
    a sliding phase pre-compensation unit to provide the initial phase compensation value, adjust the initial phase compensation value based on the preset step within the preset sliding window to obtain the phase compensation adjustment values, and select the optimal signal-to-noise ratio from the signal-to-noise ratios, and use the phase compensation adjustment value corresponding to the optimal signal-to-noise ratio as the phase compensation value;
    a phase compensation unit, a first input end of the phase compensation unit is coupled to the I channel at the front end of the DC offset estimation and calibration module or the I channel output end of the DC offset estimation and calibration module, a second input end of the phase compensation unit is coupled to the Q channel at the front end of the DC offset estimation and calibration module or the Q channel output end of the DC offset estimation and calibration module, and a third input end of the phase compensation unit is coupled to the sliding phase pre-compensation unit to sequentially compensate the initial phase compensation value and the phase compensation adjustment values to the received signals in the I channel and the Q channel, and compensate the phase compensation value to the received signals in the I channel and the Q channel to achieve the phase mismatch calibration; and
    a demodulation and signal-to-noise ratio estimation unit coupled between the phase compensation unit and the sliding phase pre-compensation unit to demodulate and estimate a signal-to-noise ratio of an output of the phase compensation unit to obtain the signal-to-noise ratio corresponding to a current phase.

8. The automatic mismatch calibration circuit according to claim 6, wherein when a number of the DC offset estimation and calibration module and the phase mismatch estimation and calibration module is multiple, the DC offset estimation and calibration modules and the phase mismatch estimation and calibration modules are arranged alternately at intervals.

9. The automatic mismatch calibration circuit according to claim 1, further comprising: at least one quadrature mismatch estimation and calibration module coupled between the RF receiver and the DC offset estimation and calibration module or at the rear end of the DC offset estimation and calibration module to estimate an amplitude mismatch of the received signals transmitted in the I channel and the Q channel to obtain an amplitude compensation value, compensate the amplitude compensation value to the received signal in the I channel or the Q channel, adjust an initial phase compensation value based on a preset step within a preset sliding window to obtain phase compensation adjustment values, sequentially compensate the initial phase compensation value and the phase compensation adjustment values to the received signals in the I channel and the Q channel, estimate a signal-to-noise ratio of the compensated received signals to obtain signal-to-noise ratios corresponding to phases, and use the phase compensation adjustment value corresponding to an optimal signal-to-noise ratio as a phase compensation value to compensate to the received signals of the I channel and the Q channel to achieve amplitude and phase mismatch calibration.

10. The automatic mismatch calibration circuit according to claim 9, wherein the quadrature mismatch estimation and calibration module comprises:
- an I channel buffer unit coupled to the I channel at a front end of the DC offset estimation and calibration module or an I channel output end of the DC offset estimation and calibration module to buffer the received signal transmitted in the I channel;
- an I channel peak averaging unit coupled to the I channel buffer unit to perform peak averaging on the received signal stored in the I channel buffer unit in a second preset time period to obtain an I channel amplitude value;
- a Q channel buffer unit coupled to the Q channel at the front end of the DC offset estimation and calibration module or a Q channel output end of the DC offset estimation and calibration module to buffer the received signal transmitted in the Q channel;
- a Q channel peak averaging unit coupled to the Q channel buffer unit to perform peak averaging on the received signal stored in the Q channel buffer unit in a second preset time period to obtain a Q channel amplitude value;
- a divider unit, a first input end of the divider unit is coupled to the I channel peak averaging unit, and a second input end of the divider unit is coupled to the Q channel peak averaging unit, to divide the Q channel amplitude value by the I channel amplitude value to obtain an amplitude compensation value;
- a sliding phase pre-compensation unit to provide the initial phase compensation value, adjust the initial phase compensation value based on the preset step within the preset sliding window to obtain the phase compensation adjustment values, and select the optimal signal-to-noise ratio from the signal-to-noise ratios, and use the phase compensation adjustment value corresponding to the optimal signal-to-noise ratio as the phase compensation value;
- a compensation unit, a first input end of the compensation unit is coupled to the I channel at the front end of the DC offset estimation and calibration module or the I channel output end of the DC offset estimation and calibration module, a second input end of the compensation unit is coupled to the Q channel at the front end of the DC offset estimation and calibration module or the Q channel output end of the DC offset estimation and calibration module, a third input end of the compensation unit is coupled to the divider unit, and a fourth input end of the compensation unit is coupled to the sliding phase pre-compensation unit to compensate the amplitude compensation value to the received signal in the I channel or the received signal in the Q channel, sequentially compensate the initial phase compensation value and the phase compensation adjustment values to the received signals in the I channel and the Q channel, and compensate the phase compensation value to the received signals in the I channel and the Q channel to achieve amplitude and phase mismatch calibration; and
- a demodulation and signal-to-noise ratio estimation unit coupled between the compensation unit and the sliding phase pre-compensation unit to demodulate and estimate a signal-to-noise ratio of an output of the compensation unit to obtain the signal-to-noise ratio corresponding to a current phase.

11. The automatic mismatch calibration circuit according to claim 10, wherein the quadrature mismatch estimation and calibration module further comprises:
- an averaging unit coupled between the divider unit and the compensation unit to average a plurality of amplitude compensation values to obtain a final amplitude compensation value.

12. The automatic mismatch calibration circuit according to claim 9, wherein when a number of the DC offset estimation and calibration module and the quadrature mismatch estimation and calibration module is multiple, the DC offset estimation and calibration modules and the quadrature mismatch estimation and calibration modules are arranged alternately at intervals.

13. An automatic mismatch calibration method, comprising:
- performing DC offset estimation and calibration operation at least once, wherein the DC offset estimation and calibration operation includes:
  - obtaining an I-channel-DC-component and a Q-channel-DC-component by estimating a DC offset of received signals transmitted in an I channel and a Q channel; and
  - compensating the I-channel-DC-component and the Q-channel-DC-component to the received signals corresponding to the I channel and the Q channel to achieve DC offset calibration,
- wherein the DC offset estimation and calibration operation comprises:
  - in a first preset time period, performing time-domain averaging on the received signal transmitted in the I channel to obtain the I-channel-DC-component, and finishing the DC offset estimation of the received signal transmitted in the I channel; performing a subtraction operation on the received signal transmitted in the I channel and the I-channel-DC-component to remove the DC offset, and realizing the DC offset calibration of the received signal transmitted in the I channel; and
  - in the first preset time period, performing time-domain averaging on the received signal transmitted in the Q channel to obtain the Q-channel-DC-component, and finishing the DC offset estimation of the received signal transmitted in the Q channel; and performing a subtraction operation on the received signal transmitted in the Q channel and the Q-channel-DC-component to remove the DC offset, and realizing the DC offset calibration of the received signal transmitted in the Q channel.

14. The automatic mismatch calibration method according to claim 13, further comprising: performing amplitude mismatch estimation and calibration operation at least once before or after the DC offset estimation and calibration operation, wherein the amplitude mismatch estimation and calibration operation includes:

estimating an amplitude mismatch of the received signals transmitted in the I channel and the Q channel to obtain an amplitude compensation value; and compensating the amplitude compensation value to the received signal in the I channel or the Q channel to achieve amplitude mismatch calibration.

15. The automatic mismatch calibration method according to claim 14, wherein the amplitude mismatch estimation and calibration operation comprises:

in a second preset time period, performing peak averaging on the received signals transmitted in the I channel and the Q channel respectively to obtain an I channel amplitude value and a Q channel amplitude value; dividing the Q channel amplitude value by the I channel amplitude value to obtain an amplitude compensation value, and finishing the amplitude mismatch estimation; and compensating the amplitude compensation value to the received signal in the I channel or the received signal in the Q channel to achieve the amplitude mismatch calibration.

16. The automatic mismatch calibration method according to claim 15, wherein the amplitude mismatch estimation and calibration operation further comprises:

repeating the method for obtaining the amplitude compensation value at least once, and averaging a plurality of amplitude compensation values to obtain a final amplitude compensation value.

17. The automatic mismatch calibration method according to claim 14, wherein when the DC offset estimation and calibration operation and the amplitude mismatch estimation and calibration operation are both performed multiple times, the DC offset estimation and calibration operation and the amplitude mismatch estimation and calibration operation are performed alternately.

18. The automatic mismatch calibration method according to claim 13, further comprising: performing a phase mismatch estimation and calibration operation at least once before or after the DC offset estimation and calibration operation, wherein the phase mismatch estimation and calibration operation includes:

adjusting an initial phase compensation value based on a preset step within a preset sliding window to obtain phase compensation adjustment values and signal-to-noise ratios corresponding to the phase compensation adjustment values, and using a phase compensation adjustment value corresponding to an optimal signal-to-noise ratio as a phase compensation value to compensate to the received signals of the I channel and the Q channel to achieve phase mismatch calibration.

19. The automatic mismatch calibration method according to claim 18, wherein the phase mismatch estimation and calibration operation comprises:

providing an initial phase compensation value, compensating the initial phase compensation value to the received signals transmitted in the I channel and the Q channel, and demodulating and estimating the signal-to-noise ratios of the received signals transmitted in the I channel and the Q channel after compensation;

adjusting an initial phase compensation value based on a preset step within a preset sliding window to obtain phase compensation adjustment values, sequentially compensating the phase compensation adjustment values to the received signals in the I channel and the Q channel, and sequentially demodulating and estimating the signal-to-noise ratios of the received signals transmitted in the I channel and the Q channel after compensation; and selecting the optimal signal-to-noise ratio from the signal-to-noise ratios, and using a phase compensation adjustment value corresponding to the optimal signal-to-noise ratio as a phase compensation value to compensate to the received signals transmitted in the I channel and the Q channel to achieve phase mismatch calibration.

20. The automatic mismatch calibration method according to claim 18, wherein when the DC offset estimation and calibration operation and the phase mismatch estimation and calibration operation are both performed multiple times, the DC offset estimation and calibration operation and the phase mismatch estimation and calibration operation are performed alternately.

21. The automatic mismatch calibration method according to claim 13, further comprising: performing a quadrature mismatch estimation and calibration operation at least once before or after the DC offset estimation and calibration operation, wherein the quadrature mismatch estimation and calibration operation includes:

estimating an amplitude mismatch of the received signals transmitted in the I channel and the Q channel to obtain an amplitude compensation value, and adjusting an initial phase compensation value based on a preset step within a preset sliding window to obtain phase compensation adjustment values;

compensating the amplitude compensation value to the received signal in the I channel or the Q channel, and sequentially compensating the initial phase compensation value and the phase compensation adjustment values to the received signals in the I channel and the Q channel; and demodulating and estimating the signal-to-noise ratios of the received signals transmitted in the I channel and the Q channel after compensation, and using a phase compensation adjustment value corresponding to the optimal signal-to-noise ratio as a phase compensation value to compensate to the received signals in the I channel and the Q channel to achieve amplitude and phase mismatch calibration.

22. The automatic mismatch calibration method according to claim 21, wherein the quadrature mismatch estimation and calibration operation comprises:

in a second preset time period, performing peak averaging on the received signals transmitted in the I channel and the Q channel respectively to obtain an I channel amplitude value and a Q channel amplitude value; dividing the Q channel amplitude value by the I channel amplitude value to obtain an amplitude compensation value, and finishing the amplitude mismatch estimation;

compensating the amplitude compensation value to the received signal in the I channel or the received signal in the Q channel, compensating the initial phase compensation value to the received signals in the I channel and the Q channel, and demodulating and estimating the signal-to-noise ratios of the received signals transmitted in the I channel and the Q channel after compensation;

adjusting the initial phase compensation value based on the preset step within the preset sliding window to obtain the phase compensation adjustment values;

compensating the amplitude compensation value to the received signal in the I channel or the received signal in the Q channel, sequentially compensating the phase compensation adjustment values to the received signals in the I channel and the Q channel, and sequentially demodulating and estimating the signal-to-noise ratios of the received signals in the I channel and the Q channel after compensation; and selecting the optimal signal-to-noise ratio from the signal-to-noise ratios, and using a phase compensation adjustment value corresponding to the optimal signal-to-noise ratio as a phase compensation value, compensating the amplitude compensation value to the received signal in the I channel or the received signal in the Q channel, and compensating the phase compensation value to the received signals in the I channel and the Q channel to achieve amplitude and phase mismatch calibration.

23. The automatic mismatch calibration method according to claim 22, wherein the quadrature mismatch estimation and calibration operation further comprises:

repeating the method for obtaining the amplitude compensation value at least once, and averaging a plurality of amplitude compensation values to obtain a final amplitude compensation value.

24. The automatic mismatch calibration method according to claim 21, wherein when the DC offset estimation and calibration operation and the quadrature mismatch estimation and calibration operation are both performed multiple times, the DC offset estimation and calibration operation and the quadrature mismatch estimation and calibration operation are performed alternately.

* * * * *